United States Patent
Nobuchi et al.

[11] Patent Number: 6,125,040
[45] Date of Patent: Sep. 26, 2000

[54] INFORMATION PROCESSING APPARATUS AND HOOK MECHANISM APPLICABLE TO THE APPARATUS

[75] Inventors: Atsunobu Nobuchi; Katsuichi Goto; Yukiya Kojima; Sonomasa Kobayashi; Taiji Mizunaga; Takumi Kishi, all of Kawasaki, Japan

[73] Assignee: Fujitsu Limited, Kawasaki, Japan

[21] Appl. No.: 09/034,008

[22] Filed: Mar. 2, 1998

[51] Int. Cl.[7] .................................. G06F 1/16; H05K 7/16
[52] U.S. Cl. ........................ 361/726; 361/680; 361/681; 312/223.1; 312/223.2
[58] Field of Search .................................... 361/680, 681, 361/683, 726–727; 312/223.1–223.6

[56] References Cited

U.S. PATENT DOCUMENTS

| | | | |
|---|---|---|---|
| 5,410,447 | 4/1995 | Miyagawa et al. | |
| 5,481,430 | 1/1996 | Miyagawa et al. | |
| 5,594,619 | 1/1997 | Miyagawa et al. | |
| 5,646,817 | 7/1997 | Manser et al. | 361/680 |
| 5,666,694 | 9/1997 | Slow et al. | |
| 5,769,515 | 6/1998 | Chang | 361/726 |
| 5,901,035 | 5/1999 | Foster et al. | 361/683 |
| 5,905,550 | 5/1999 | Ohgami et al. | 361/681 |

FOREIGN PATENT DOCUMENTS

| | | |
|---|---|---|
| 0 454 120 | 10/1991 | European Pat. Off. . |
| 0 600 410 | 6/1994 | European Pat. Off. . |
| 96 03685 | 2/1996 | WIPO . |

*Primary Examiner*—Leo P. Picard
*Assistant Examiner*—Hung Van Duong
*Attorney, Agent, or Firm*—Armstrong, Westerman, Hattori, McLeland & Naughton

[57] ABSTRACT

An information processing apparatus which includes a first member (for example, a cover having a display unit thereon), a second member (for example, an apparatus body having a keyboard thereon), and a connection unit. The first member has a first face (for example, a face on which the display unit is provided) and a second face (for example, an outer face of the cover). The connection unit connects the first and second members to each other such that the first and second members are displaceable relative to each other between a first condition wherein the first face opposes the second member and a second condition wherein the second face opposes the second member. The first member has a hook member provided thereon such that the hook member can selectively project from one of the first and second faces. The second member has a hole for being engaged by the hook member. With the construction described, since the hook member of the first member can be engaged with the hole of the second member in each of the first and second conditions, two different closed conditions can be maintained.

57 Claims, 15 Drawing Sheets

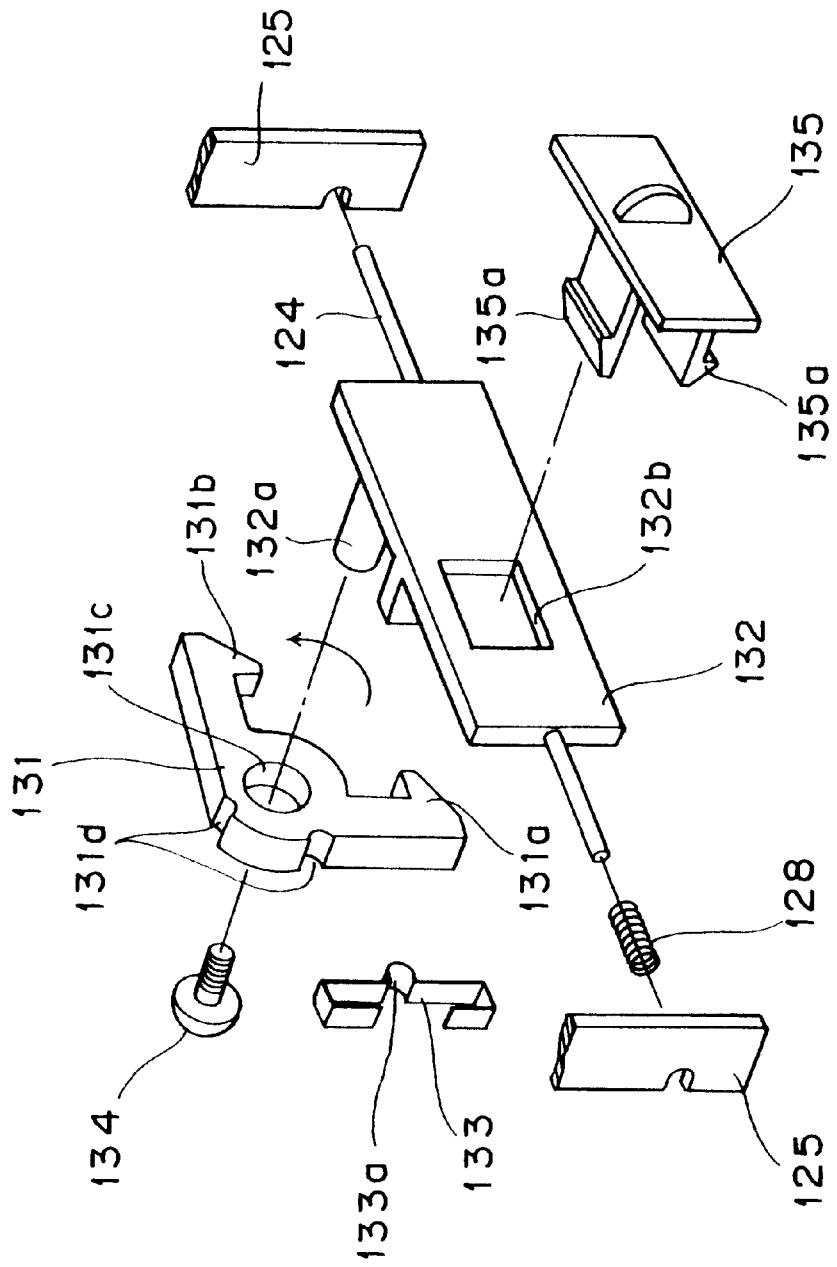

INFORMATION PROCESSING APPARATUS AND HOOK MECHANISM APPLICABLE TO THE APPARATUS

BACKGROUND OF THE INVENTION

1. Field of the Invention

This invention relates to an information processing apparatus and a hook mechanism applicable to the apparatus.

2. Description of the Related Art

As an information processing apparatus which can be carried suitably, an apparatus is known which includes a first member (for example, a cover having a display unit), a second member (for example, an apparatus body having a keyboard unit), and a connection member for connecting the first and second members to each other. A condition wherein the first member is closed with respect to the second member is suitable for protection of the keyboard unit and the display unit when the apparatus is carried, but another condition wherein the first member is open with respect to the second member is suitable for use of the apparatus using the keyboard unit and/or the display unit.

As a conventional simple hook mechanism which can be applied to such an apparatus as described above, a hook mechanism is known wherein a displaceable hook member is provided on one of the first and second members while a hole for being engaged by the hook member is formed in the other of the first and second members. Since the hook member is engaged, in a condition wherein the first member is closed with respect to the second member, with the hole to keep the closed condition, transportation of the apparatus is facilitated. On the other hand, if the engagement of the hook member with the hole is cancelled, then the first member can be opened with respect to the second member.

In recent years, an information processing apparatus with which a stylus (stylus pen) can be used to effect an inputting operation has been put into practical use. In the apparatus, a transparent touch panel is provided on the surface of a display unit (or a LCD) such that the stylus is touched at an end thereof with the touch panel to effect inputting or assist inputting by a keyboard. And, there is another type of touch panel which uses an electromagnetic induction digitizer detecting magnetic from the stylus pen. This electromagnetic induction digitizer is located under the LCD, the stylus pen generates magnetic when the stylus touches the LCD, and the electromagnetic induction digitizer detects this magnetic to point or input to the display thereby.

When only the stylus is used to perform an inputting operation, if the first member having the display unit is open with respect to the second member, then the inputting operation cannot sometimes be performed readily. Therefore, it is convenient if, where the first member has a first face and a second face and the display unit is provided on the first face, a first condition wherein the first face opposes the second member and a second condition wherein the second face opposes the second member are available. Thus, since the first member is closed with respect to the second member in both of the first and second conditions and, in the second condition, the display unit is directed outwardly of the apparatus, an inputting operation using the touch panel and the stylus can be performed readily.

In order to obtain the first and second conditions, a connection member for connecting the first and second members to each other may be improved. The improved connection member includes two axes extending in parallel to each other for individually supporting the first member for pivotal motion or two axes extending perpendicularly to each other for individually supporting the first member for pivotal motion.

If such an improved connection member as just described and a conventional simple hook mechanism described above are combined, then since the hook mechanism can keep the closed condition only in one of the first and second conditions, the operability is deteriorated in that an inputting operation using the stylus cannot be performed readily and so forth.

While this problem can be eliminated if two conventional simple hook mechanisms are used, this complicates the construction.

SUMMARY OF THE INVENTION

Accordingly, it is an object of the present invention to provide an information processing apparatus of a simple construction which includes two members by which two different closed conditions can be kept.

It is another object of the present invention to provide a hook mechanism which can be applied to such an apparatus as just described.

Further objects of the present invention will become apparent from the following description.

According to an aspect of the present invention, there is provided an information processing apparatus which comprises a first member, a second member, and a connection member or unit. The first member has a first face and a second face. The connection member connects the first and second members to each other such that the first and second members are displaceable relative to each other between a first condition wherein the first face of the first member opposes the second member and a second condition wherein the second face of the first member opposes the second member. The first member has a hook member provided thereon such that the hook member can be selectively projected from one of the first and second faces. The second member has a hole for being engaged by the hook member.

With the construction described above, since the hook member of the first member can be engaged with the hole of the second member in each of the first and second conditions, one of the objects is achieved.

According to a preferred embodiment of the present invention, the second member has a third face and a fourth face and the hole is provided in each of the third and fourth faces, and the connection member includes two axes extending parallel to each other for individually supporting the first member for pivotal motion. Such a connection member as just described can be constructed simply as hereinafter described in detail. In the first condition, the hook member is engaged with the hole of the third face with the first face and the third face opposed to each other, but in the second condition, the hook member is engaged with the hole of the fourth face with the second face and the fourth face opposed to each other.

Accordingly, in this instance, if a display unit is provided on the first face of the first member and a keyboard unit is provided on the third face of the second member, then, in the first condition, the display unit and the keyboard unit are confined between the first and second members, but in the second condition, the display unit and the keyboard unit are directed outwardly of the information processing apparatus.

According to another preferred embodiment of the present invention, the second member has a third face and a fourth face and the hole is provided in the third face, and the connection member includes two axes extending perpendicularly to each other for individually supporting the first member for pivotal motion. Then, in the first condition, the hook member is engaged with the hole with the first face and the third face opposed to each other, but in the second condition, the hook member is engaged with the hole with the second face and the third face opposed to each other.

Accordingly, in this instance, if a display unit is provided on the first face of the first member and a keyboard unit is provided on the third face of the second member, then, in the first condition, the display unit and the keyboard unit are confined between the first and second members, but in the second condition, the display unit is directed outwardly of the information processing apparatus and the keyboard unit is confined between the first and second members.

According to another aspect of the present invention, there is provided a hook mechanism, comprising a housing having a first face and a second face, a slider mounted for sliding movement in the housing, a hook member mounted for pivotal motion within a range of approximately 90 degrees with respect to the slider, and a spring for biasing the hook member in its pivoting direction. The hook member has a first pawl and a second pawl disposed substantially perpendicularly to each other. The first pawl is positioned in the housing when the second pawl projects from the second face whereas, when the first pawl projects from the first face, the second pawl is positioned in the housing.

According to a further aspect of the present invention, there is provided an information processing apparatus, comprising a first member having a first face and a second face, a second member, a connection member or unit for connecting the first and second members to each other such that the first and second members are displaceable relative to each other between a first condition wherein the first face of the first member opposes the second member and a second condition wherein the second face of the first member opposes the second member, and a slider mounted for sliding movement between a position in which the slider holds the first and second members in-between and another position in which the slider does not hold the first and second members in-between in each of the first and second conditions.

The above and other objects, features and advantages of the present invention and the manner of realizing them will become apparent, and the invention itself will best be understood, from a study of the following description and appended claims with reference to the attached drawings showing some preferred embodiments of the invention.

BRIEF DESCRIPTION OF THE DRAWINGS

FIG. 11 is a fragmentary perspective view showing a principal portion of the third embodiment of the hook mechanism;

DESCRIPTION OF THE PREFERRED EMBODIMENTS

In the following, preferred embodiments of the present invention are described in detail with reference to the accompanying drawings.

Figure 1:
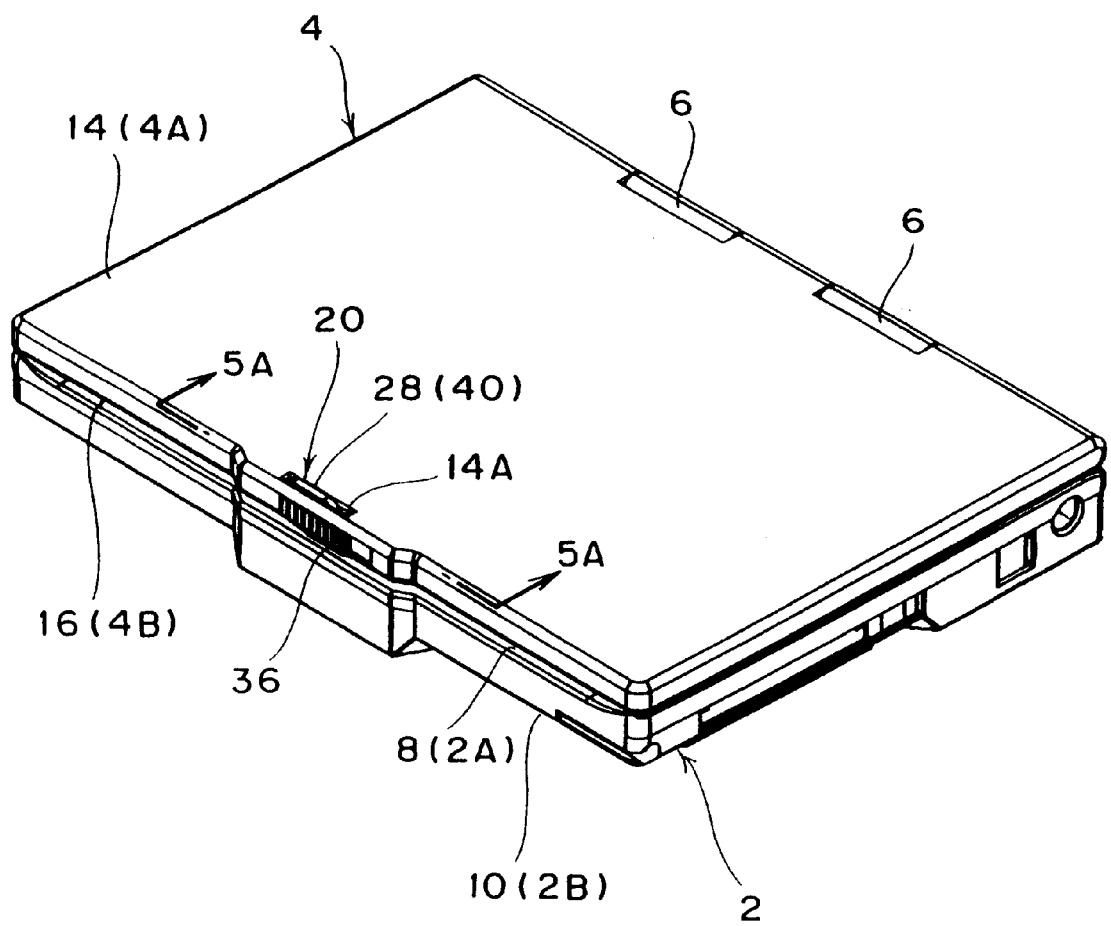
FIG. 1 is a perspective view showing a first condition of an embodiment of an information processing apparatus according to the present invention.
Figure 2:
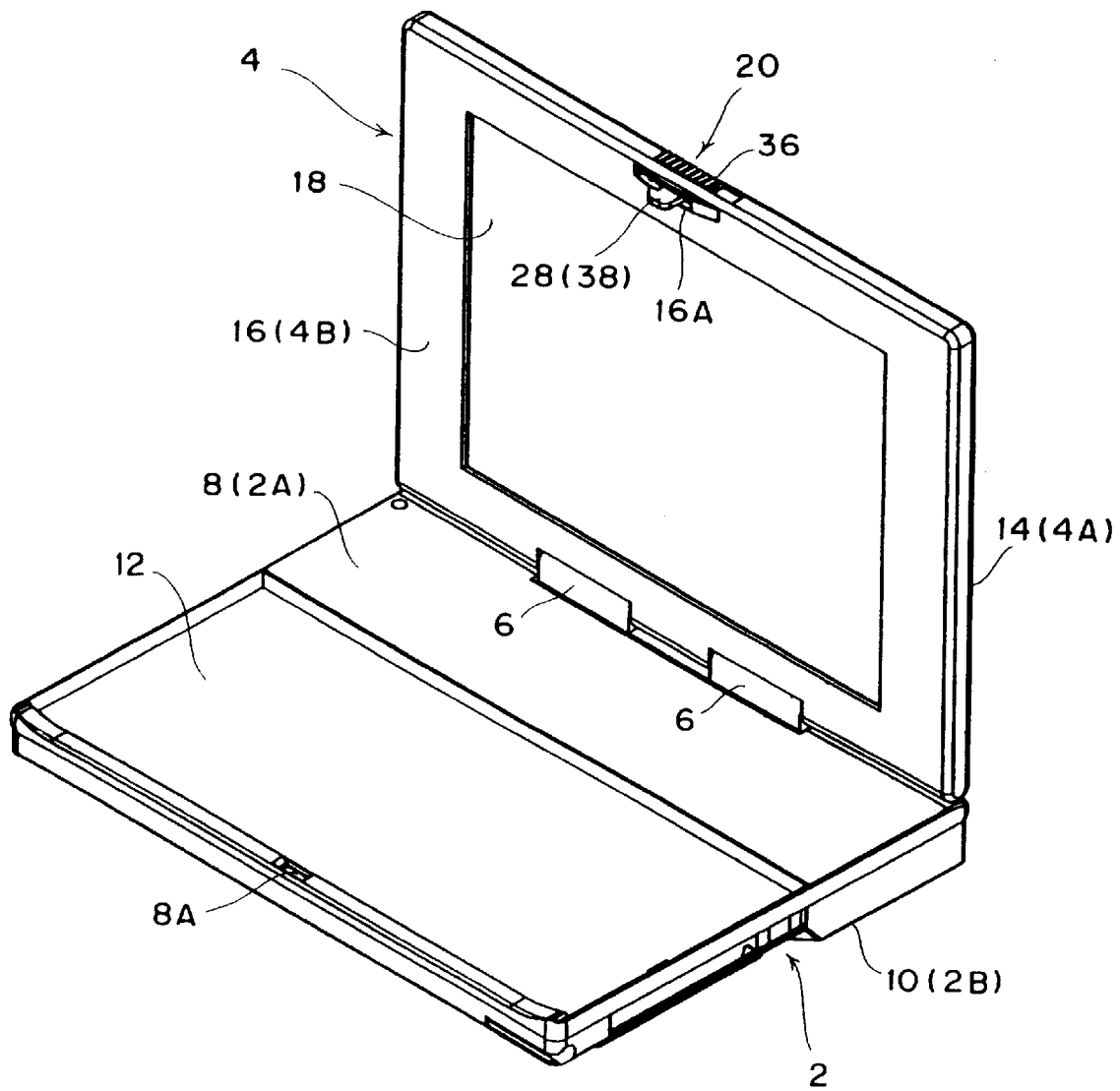
FIG. 2 is a perspective view showing a condition between the first condition and a second condition of the embodiment of the information processing apparatus of the present invention.
Figure 3:
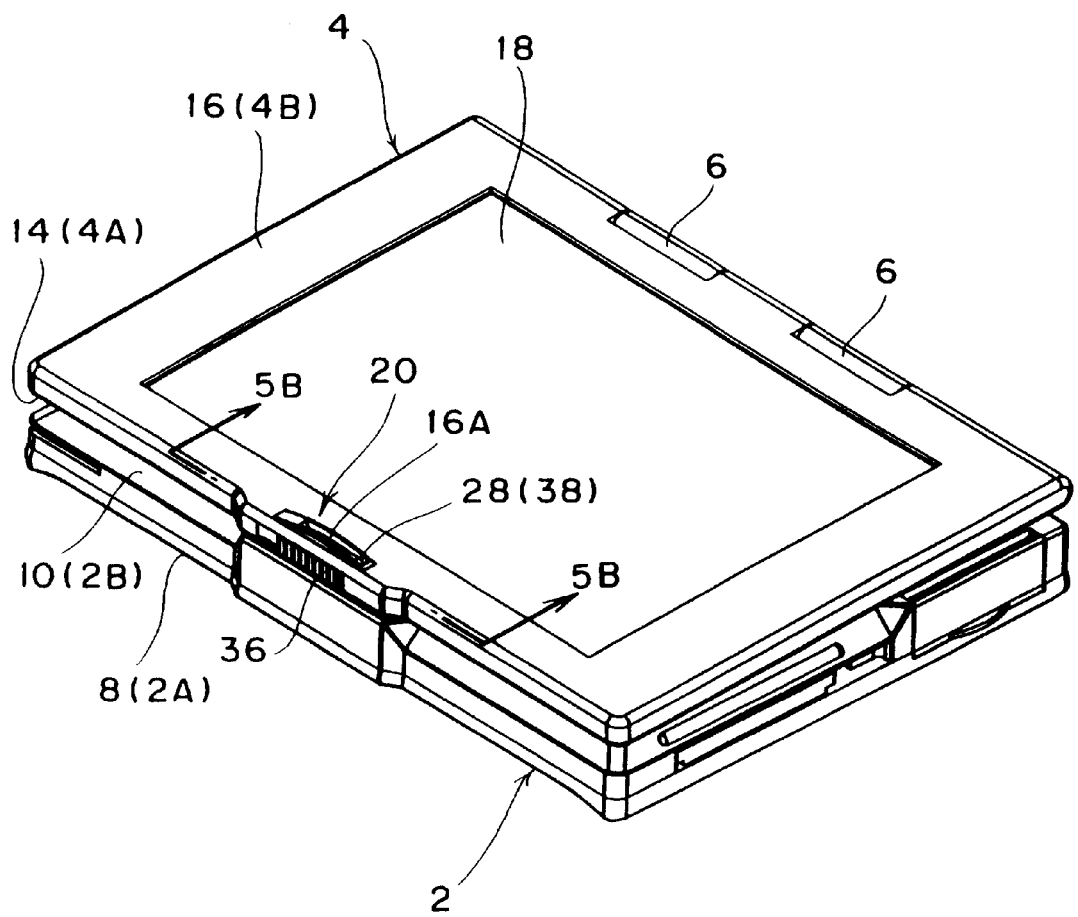
FIG. 3 is a perspective view showing the second condition of the embodiment of the information processing apparatus of the present invention.

FIGS. 1 to 3 are perspective views showing an embodiment of an information processing apparatus according to the present invention. This apparatus may be an information processing apparatus (personal computer, word processor or the like) of the lap top type, the notebook type or of some other portable type. The apparatus includes an apparatus body (which corresponds to the second member) 2, a cover (which corresponds to the first member) 4, and a connection member or unit 6 for connecting the apparatus body 2 and the cover 4 to each other.

The apparatus body 2 includes an upper housing 8 and a lower housing 10 for providing an upper face 2A and a lower face 2B of the apparatus body 2, respectively. A keyboard unit 12 to be used for inputting of data and so forth is provided on the upper housing 8. In other words, the apparatus body 2 has the keyboard unit 12 on the upper face 2A thereof.

It is to be noted that the words "upper" and "lower" are defined in accordance of the condition of the apparatus shown in FIG. 1.

The cover 4 includes an upper housing 14 and a lower housing 16 for providing an upper face 4A and a lower face 4B of the cover 4, respectively. A display unit 18 to be used for displaying and for stylus inputting is provided on the lower housing 16 of the cover 4. In other words, the cover 4 has the display unit 18 on the lower face 4B thereof. The display unit 18 includes, for example, an LCD (liquid crystal display) panel and a transparent touch panel provided on the LCD panel. And, there is another type of touch panel which uses an electromagnetic induction digitizer detecting magnetic from the stylus pen. This electromagnetic induction digitizer is located under the LCD, the stylus pen generates magnetic when the stylus touches the LCD, and the electromagnetic induction digitizer detects this magnetic to point or input to the display thereby.

In order to releasably keep a condition wherein the cover 4 is closed with respect to the apparatus body 2, the cover 4 has a hook mechanism 20. Each of the apparatus body 2 and the cover 4 is in the form of a generally quadrangular flat plate, and the hook mechanism 20 is positioned along an edge of the cover 4 remote from the connection member 6. The reason why the position of the hook mechanism 20 is set in this manner is that it is intended to suppress the force which may act upon the hook mechanism 20 in order to keep the condition wherein the cover 4 is closed with respect to the apparatus body 2 to the minimum. Details of a construction and operation of the hook mechanism 20 will be hereinafter described.

Figure 4:
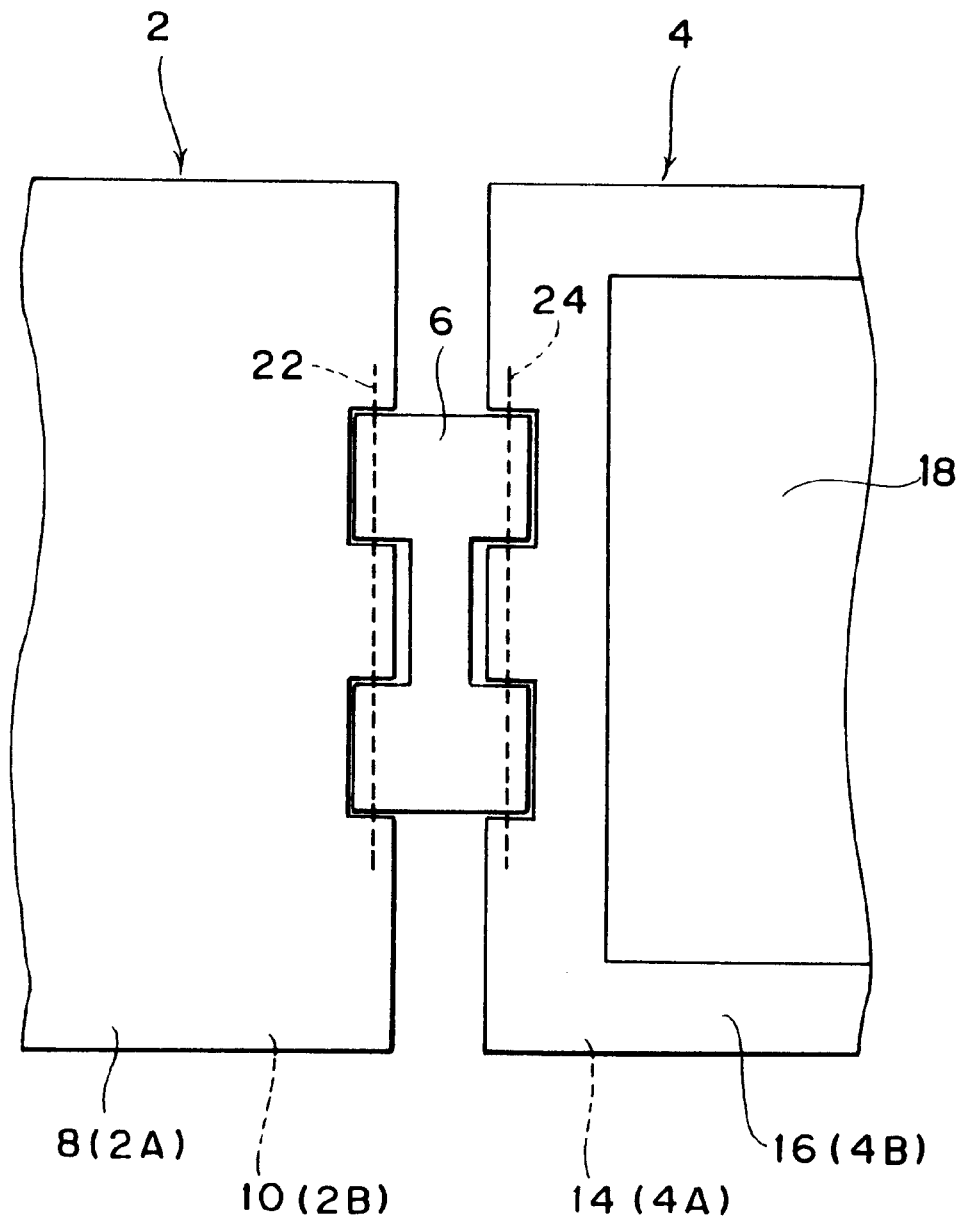
FIG. 4 is a plan view of a connection member which can be applied to the present invention.

In the present embodiment, as can be seen well from FIG. 4, the connection member 6 can be constructed simply such that it has two axes 22 and 24 extending parallel to each other for each supporting the cover 4 for pivotal motion with respect to the apparatus body 2. More particularly, the connection member 6 is supported for pivotal motion within a range of approximately 180 degrees with respect to the apparatus body 2 by the axis 22, and the cover 4 is supported for pivotal motion within a range of approximately 180 degrees with respect to the connection member 6 by the axis 24. As a result, the cover 4 is supported for pivotal motion within a range of 360 degrees with respect to the apparatus body 2.

By adoption of the connection member 6 having such a construction as described above, the apparatus body 2 and the cover 4 can be displaced relative to each other between a first condition wherein the cover 4 is closed with respect to the apparatus body 2 with the lower face 4B of the cover 4 opposed to the apparatus body 2 as seen in FIG. 1 and a second condition wherein the cover 4 is closed with respect to the apparatus body 2 with the upper face 4A of the cover 4 opposed to the apparatus body 2 as seen in FIG. 3.

In the condition shown in FIG. 1, the lower face 4B of the cover 4 opposes the upper face 2A of the apparatus body 2, but in the condition shown in FIG. 3, the upper face 4A of the cover 4 opposes the lower face 2B of the apparatus body 2. Accordingly, in the first condition, since the keyboard unit 12 and the display unit 18 are confined between the apparatus body 2 and the cover 4, protection of the keyboard unit 12 and the display unit 18 is allowed. On the other hand, in the second condition, since the keyboard unit 12 and the display unit 18 are directed outwardly of the apparatus, if the apparatus is held in hand or placed on a desk with the apparatus body 2 positioned downwardly, for example, then the display unit 18 is directed upwardly, and inputting using the stylus can be performed readily while the display unit 18 is observed.

Further, since, by providing suitable friction to pivotal motion between each of the apparatus body 2 and the cover 4 and the connection member 6, the cover 4 and the apparatus body 2 can be kept in a condition wherein the cover 4 is open with respect to the apparatus body 2 as seen in FIG. 2 between the first and second conditions, an inputting operation using the keyboard unit 12 can be performed while the display unit 18 is observed. An inputting operation using the stylus can be performed using the display unit 18 in the condition shown in FIG. 2. Though not shown, the apparatus may be used in such a condition that the keyboard unit 12 and the display unit 18 are directed upwardly by pivoting the cover 4 by approximately 180 degrees from the condition shown in FIG. 1.

Figure 5A:
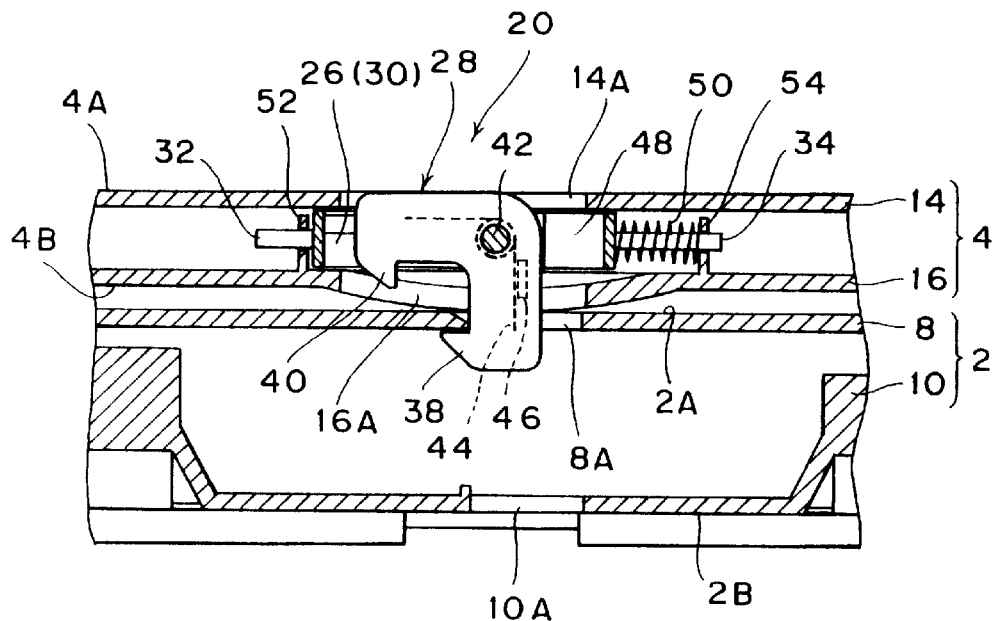
FIGS. 5A and 5B are sectional views showing a first embodiment of a hook mechanism which can be applied to the present invention.
Figure 5B:
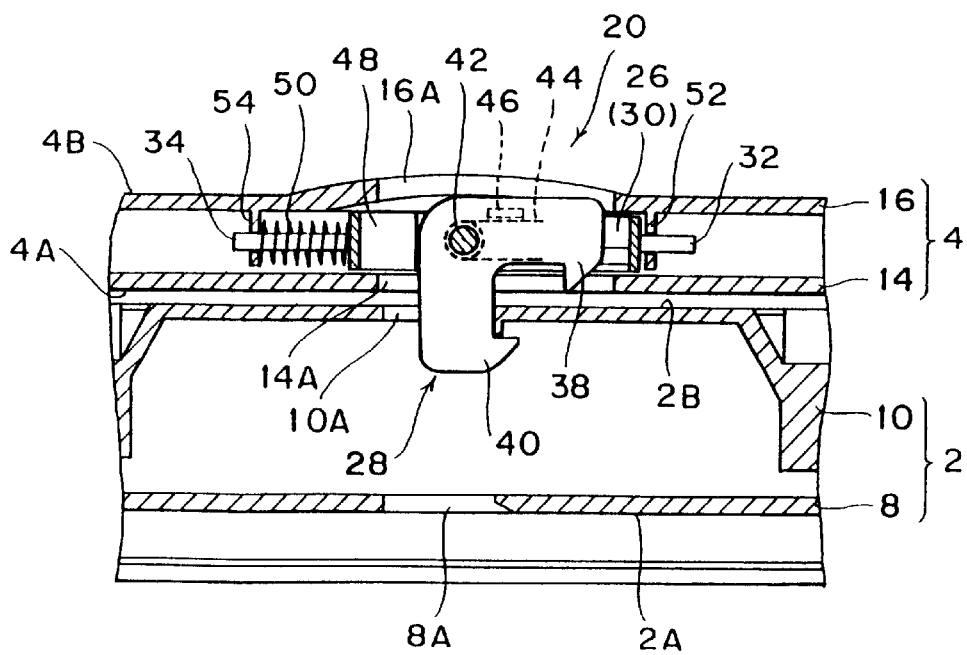
Figure 6:
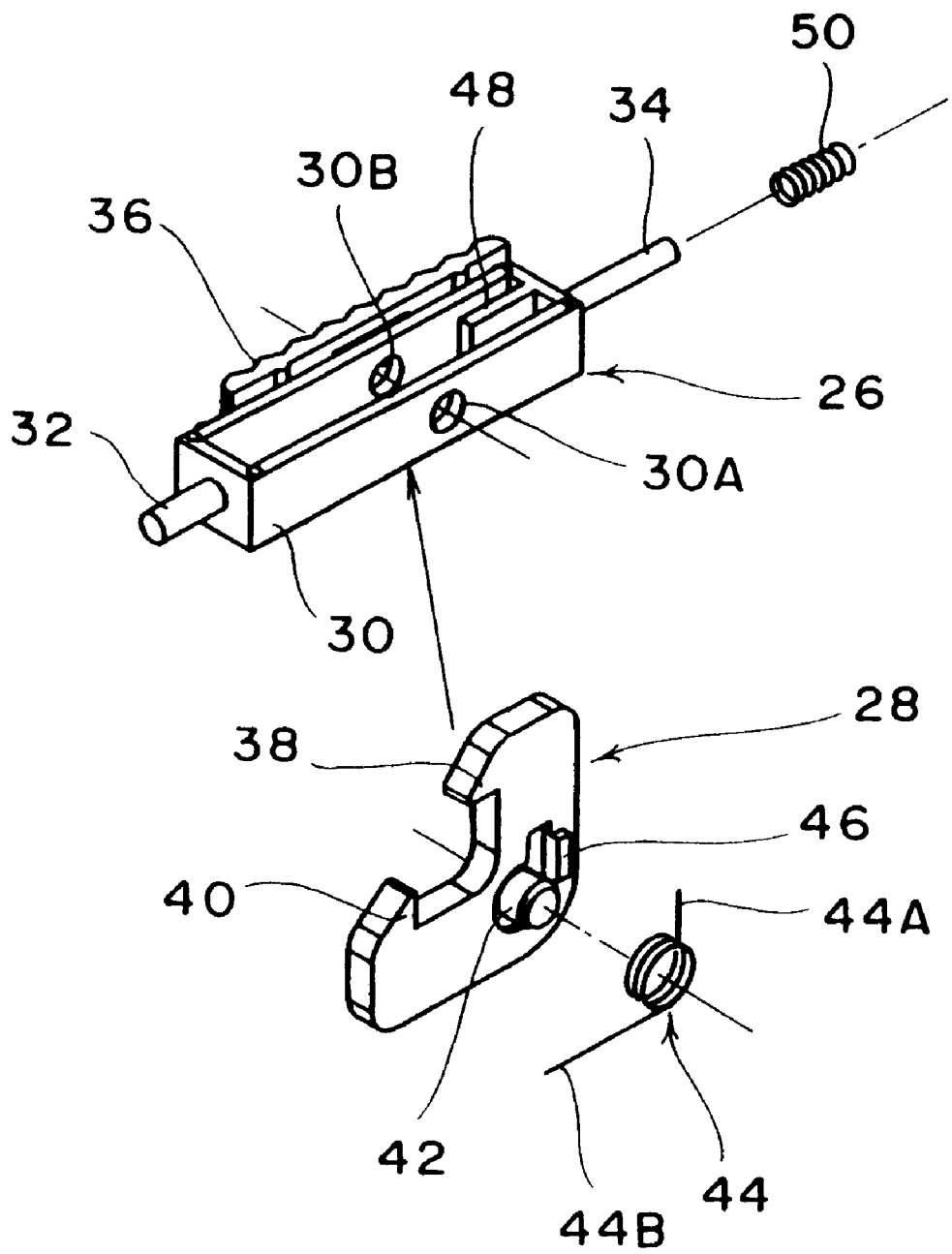
FIG. 6 is a fragmentary perspective view showing a principal portion of the first embodiment of the hook mechanism.

FIGS. 5A and 5B are sectional views showing a first embodiment of the hook mechanism, and FIG. 6 is a fragmentary perspective view showing a principal portion of the first embodiment of the hook mechanism. More particularly, in FIG. 5A, a section of the hook mechanism 20 taken along line 5A—5A of FIG. 1 is shown, and in FIG. 5B, a section of the hook mechanism 20 taken along line 5B—5B of FIG. 3 is shown. Further, in FIG. 6, a principal portion of the hook mechanism 20 is shown.

As can be seen well from FIG. 6, the hook mechanism 20 includes a slider 26, and a hook member 28 mounted for pivotal motion within a range of approximately 90 degrees on the slider 26. The slider 26 has a frame 30 in the form of a box which is open at the top and the bottom thereof, and a comparatively short sliding shaft 32 and a comparatively long sliding shaft 34 which project in the opposite directions to each other from the longitudinal opposite ends of the frame 30. A slide button 36 is provided on one side portion of the frame 30.

The hook member 28 has a first pawl 38 and a second pawl 40 disposed substantially in a perpendicular relationship to each other. The pawls 38 and 40 substantially have a relationship of a mirror image relative to each other. The hook member 28 further has a shaft 42 which provides the center of pivotal motion of the hook member 28, and a projection 46 formed in the proximity of the shaft 42. A spring 44 is mounted on one side of the hook member 28 such that it surrounds the shaft 42, and the opposite ends of the shaft 42 are inserted in a pair of holes 30A and 30B formed in the frame 30 to mount the hook member 28 on the slider 26.

A stopper 48 for limiting the range of pivotal motion of the hook member 28 approximately to 90 degrees is formed on an inner side of the frame 30. One end 44A of the spring 44 is held in contact with the projection 46 of the hook member 28 while the other end 44B of the spring 44 is held in contact with a shoulder not shown formed on the inner side of the frame 30. The spring 44 biases, by a resilient restoring force to tend to increase the angle defined between the one end 44A and the other end 44B thereof, the hook member 28 in a direction to contact the back of the first pawl 38 with the stopper 48. A coil spring 50 is mounted on the comparatively long sliding shaft 34.

As can be seen well from FIG. 5A, two slider receiving portions 52 and 54 which extend into the cover 4 are formed on the lower housing 16 of the cover 4. The sliding shafts 32 and 34 of the slider 26 are supported for sliding movement by the slider receiving portions 52 and 54, respectively. Accordingly, the slider 26 can be slidably moved in the cover 4. The coil spring 50 is interposed between the slider receiving portion 54 and the frame 30 of the slider 26, and accordingly, the coil spring 50 biases the slider 26 in a direction from the slider receiving portion 54 toward the slider receiving portion 52.

The upper housing 14 of the cover 4 has an opening 14A so as allow the second pawl 40 of the hook member 28 to project upwardly from the upper face 4A of the cover 4. The lower housing 16 of the cover 4 has an opening 16A so as to allow the first pawl 38 of the hook member 28 to project downwardly from the lower face 4B of the cover 4. A portion of the lower housing 16 around the opening 16A is smoothly curved downwards so that a predetermined distance may be provided between the apparatus body 2 and the cover 4 in the first condition. The upper housing 8 of the apparatus body 2 has a hole 8A with which the first pawl 38 of the hook member 28 is to engage. The lower housing 10 of the apparatus body 2 has a hole 10A with which the second pawl 40 of the hook member 28 is to engage.

The slide button 36 is directed outwardly of the cover 4 as seen, for example, in FIG. 1. The slide button 36 is connected to the slider 26 on the inner side of the cover 4 through an opening not shown formed in the cover 4. Accordingly, by moving the slide button 36, the slider 26 can be moved from the left toward the right in FIG. 5A against the biasing force of the coil spring 50.

Operation of the hook mechanism 20 upon transition from the condition shown in FIG. 2 to the first condition shown in FIG. 1 is described in detail. In the condition shown in FIG. 2, since the back of the first pawl 38 of the hook member 28 is pressed against the stopper 48 by the biasing force of the spring 44, the first pawl 38 projects downwardly from the lower face 4B of the cover 4 through the opening 16A. In this instance, the second pawl 40 of the hook member 28 is positioned in the cover 4. If, from the condition just described, the cover 4 is closed toward the first condition shown in FIG. 1 with respect to the apparatus body 2, then a tapering portion on the outer side of the first pawl 38 is brought into contact with a tapering portion formed on the hole 8A, and then, by sliding movements of the tapering portions on each other, the direction of the force applied to the hook member 28 is changed. Consequently, the coil spring 50 is contracted a little by the force tending to close the cover 4 with respect to the apparatus body 2. Thereafter, when an end of the first pawl 38 passes an end of the tapering portion of the hole 8A, the coil spring 50 is released to cancel its contraction and a horizontal face on the inner side of the first pawl 38 is engaged with an inner face of the upper housing 8 of the apparatus body 2 in the proximity of the hole 8A. After the hook member 28 is engaged with the hole 8A in this manner, the first condition shown in FIG. 1 is kept.

When it is intended to change over the condition of the apparatus from the condition shown in FIG. 1 to the condition shown in FIG. 2, the slider 26 is slidably moved using the slide button 36 to contract the coil spring 50. Consequently, the engagement of the first pawl 38 with the hole 8A is cancelled, and the first pawl 38 can pass in the hole 8A.

Now, operation of the hook mechanism 20 when the condition of the apparatus is changed over from the condition shown in FIG. 2 to the second condition shown in FIG. 3 is described. In the condition shown in FIG. 2, the back of the first pawl 38 is held in contact with the stopper 48 by the biasing force of the spring 44 and the hook member 28 is in a stable condition. If a force acting against the biasing force of the spring 44 is applied to the first pawl 38 by a finger, then the hook member 28 can be pivoted until the back of the second pawl 40 is brought into contact with the stopper 48. In particular, the hook member 28 is pivoted by 90 degrees clockwise from the condition shown in FIG. 5A. As a result of the pivotal motion of the hook member 28, the first pawl 38 is positioned in the cover 4 and the second pawl 40 projects upwardly from the upper face 4A of the cover 4 through the opening 14A. Accordingly, if the cover 4 is closed toward the second condition shown in FIG. 3 with respect to the apparatus body 2 while keeping the condition described above in a manner wherein the opening 16A is closed up with a finger, then the second pawl 40 can be engaged with the hole 10A of the lower housing 10 of the apparatus body 2 as seen in FIG. 5B in a similar manner as in the case wherein the first condition is reached. Accordingly, the second condition shown in FIG. 3 can be kept by the hook mechanism 20.

When it is intended to change over the condition of the apparatus from the second condition shown in FIG. 3 to the condition shown in FIG. 2, the slide button 36 is moved to slidably move the slider 26 to contract the coil spring 50. This makes it possible for the second pawl 40 of the hook member 28 to pass through the hole 12A, and consequently, the cover 4 can be opened. In this instance, when the cover 4 is moved away from the apparatus body 2, the biasing force of the spring 44 is released, and consequently, the hook member 28 is automatically pivoted by 90 degrees so that the stable condition shown in FIG. 2 is restored.

The reason why the spring 44 is used in the present embodiment to stabilize the hook member 28 as seen in FIG. 2 is that normally the operation for closing the cover 4 from the condition shown in FIG. 2 toward the first condition shown in FIG. 1 is performed much more frequently than the operation for closing the cover 4 from the condition shown in FIG. 2 toward the second condition shown in FIG. 3 and such a stable position of the hook member 28 as shown in FIG. 2 is more advantageous for the former operation.

In order to allow the first condition shown in FIG. 1 to be kept and allow the second condition shown in FIG. 3 to be kept, it may be proposed to adopt such a conventional simple hook mechanism as described hereinabove. In this instance, however, since one hook mechanism is required to keep the first condition and another one hook mechanism is required to keep the second condition, the apparatus is complicated in construction. Besides, since the hook mechanism for keeping the second condition makes an obstacle in the first condition whereas the hook mechanism for keeping the first condition makes an obstacle in the second condition, the operability of the apparatus is deteriorated and the good appearance of the apparatus is deteriorated.

In contrast, with the hook mechanism 20 provided on the cover 4 in the present embodiment, since the hook member 28 has the first pawl 38 and the second pawl 40 so that the hook member 28 can selectively project from any one of the upper face 4A and the lower face 4B of the cover 4, in whichever one of the first and second conditions the apparatus is, the hook member 28 does not come out of the apparatus by operating the hook mechanism 20 in each of the first and second conditions. Consequently, operability of the apparatus is improved and the appearance of the apparatus is improved.

Further, by keeping any of the first and second conditions using the hook mechanism 20, transportation of the apparatus is facilitated.

Furthermore, by keeping the second condition shown in FIG. 3 using the hook mechanism 20, when the apparatus is held by a hand or placed on a desk in the condition of FIG. 3 and an inputting operation is performed using the display unit 18 and the stylus, the stability of the form of the apparatus is increased and the operability is improved.

Further, since the hook member 28 which is a single member is used commonly to keep the first and second conditions, the apparatus is simplified in construction comparing with an alternative apparatus which uses two such conventional simple hook mechanisms as described above.

Further, when any of the first and second conditions is kept using the hook mechanism 20, since the hook member 28 does not project outwardly of the apparatus, the safety is secured.

Further, since the spring 44 is adopted in order to pivot back the hook member 28, the hook member 28 can be returned automatically to such a position at which the hook member 28 should stand by as seen in FIG. 2. Consequently, the operability is improved and the safety is improved.

Figure 7A:
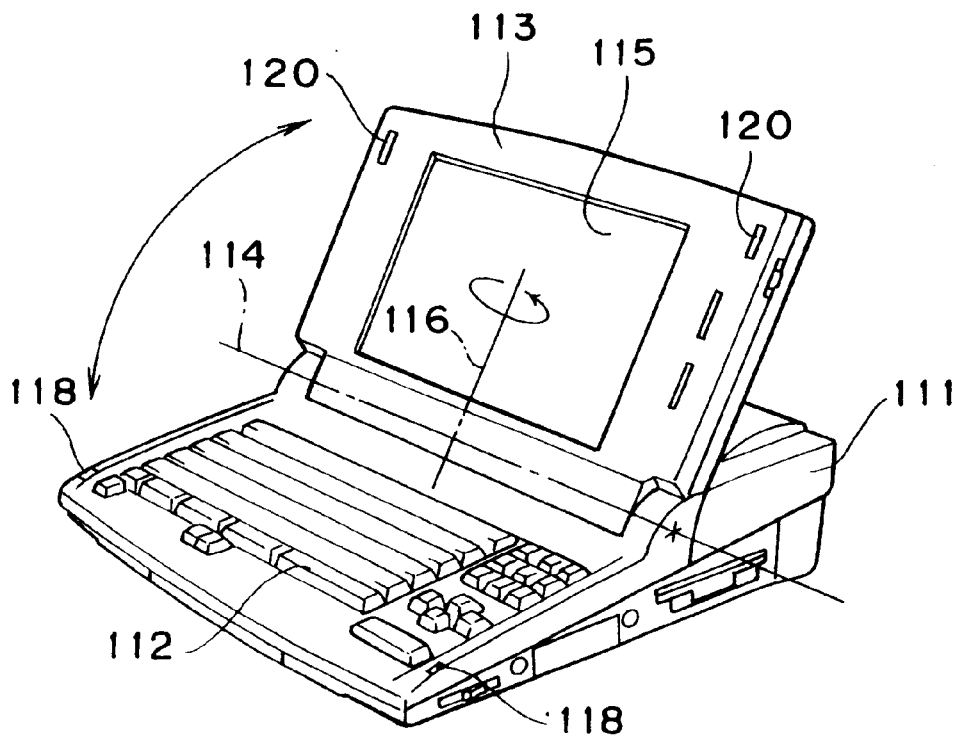
FIGS. 7A and 7B are perspective views showing another embodiment of the information processing apparatus according to the present invention.
Figure 7B:
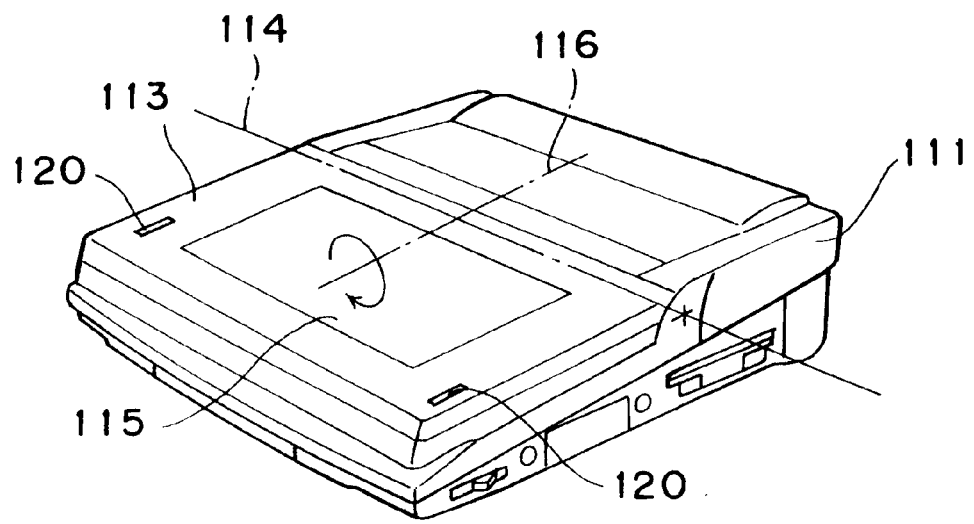

FIGS. 7A and 7B are perspective views showing another embodiment of the information processing apparatus according to the present invention. Reference numeral 111 denotes an apparatus body, and the apparatus body 111 has a keyboard unit 112 for performing an inputting operation. Reference numeral 113 denotes a cover, and the cover 113 is formed as a plate of a generally rectangular shape and supported for opening and closing movement on the apparatus body 111 by a horizontal first axis 114. The cover 113 includes a display unit 115 on a face (front surface) thereof which opposes the keyboard unit 112 in a condition wherein it is closed around the first axis 114.

The cover 113 is supported for pivotal motion by approximately 180 degrees around a second axis 116 substantially perpendicular to the first axis 114 in a condition wherein it is open around the first axis 114 in such a manner that the front surface and the rear surface are replaced with each other as seen in FIG. 7B.

By closing the cover 113 around the first axis 114 in a condition wherein the cover 113 is reversed around the second axis 116, the cover 113 is positioned on the keyboard unit 112 with the display unit 115 directed upwardly as seen in FIG. 7B.

When the present apparatus is not used, the cover 113 is closed in such a manner that the display unit 115 opposes the keyboard unit 112 so that the display unit 115 and the keyboard unit 112 are protected by the cover 113.

When the present apparatus is used to perform inputting operation using the keyboard unit 112 and the stylus, the cover 113 is put into an open condition around the first axis 114 as seen in FIG. 7A. When an inputting operation is to be performed using only the stylus, the cover 113 is reversed around the second axis 116 from the open condition and then it is put into a closed condition around the first axis 114 as seen in FIG. 7B.

Figure 8A:
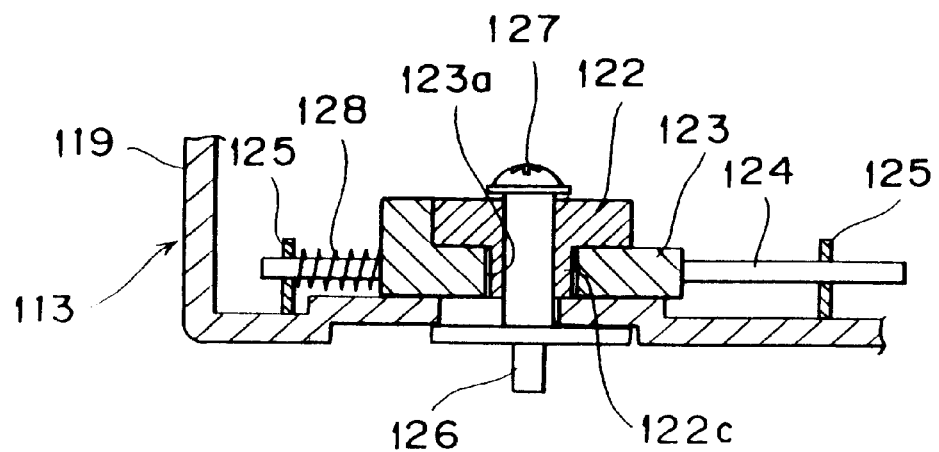
FIGS. 8A and 8B are sectional views showing a second embodiment of the hook mechanism which can be applied to the present invention.
Figure 8B:
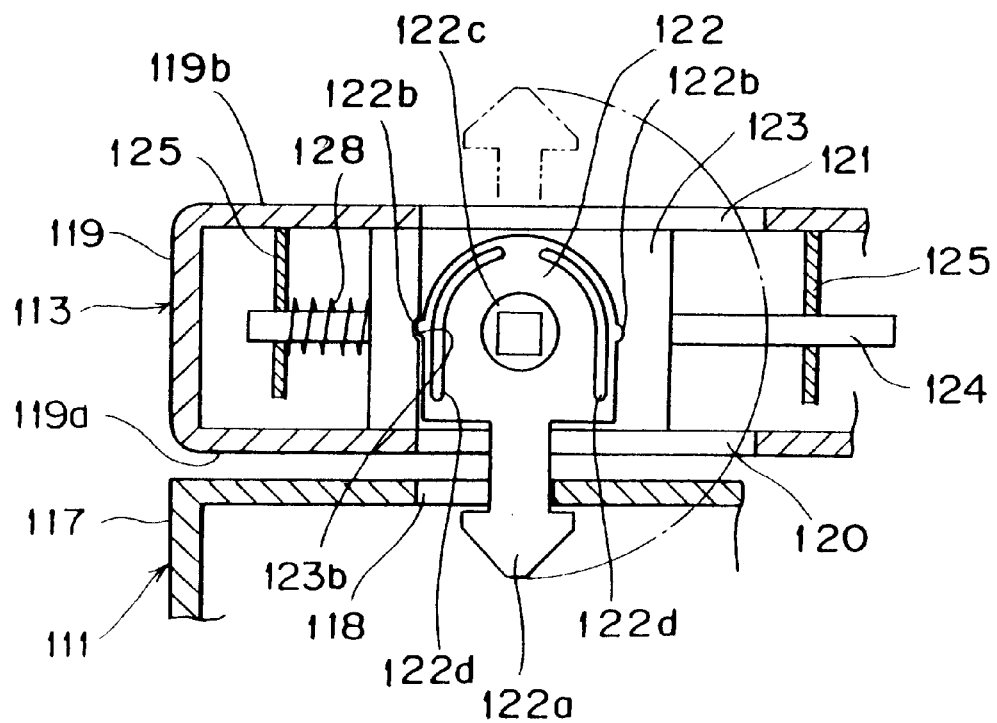
Figure 9:
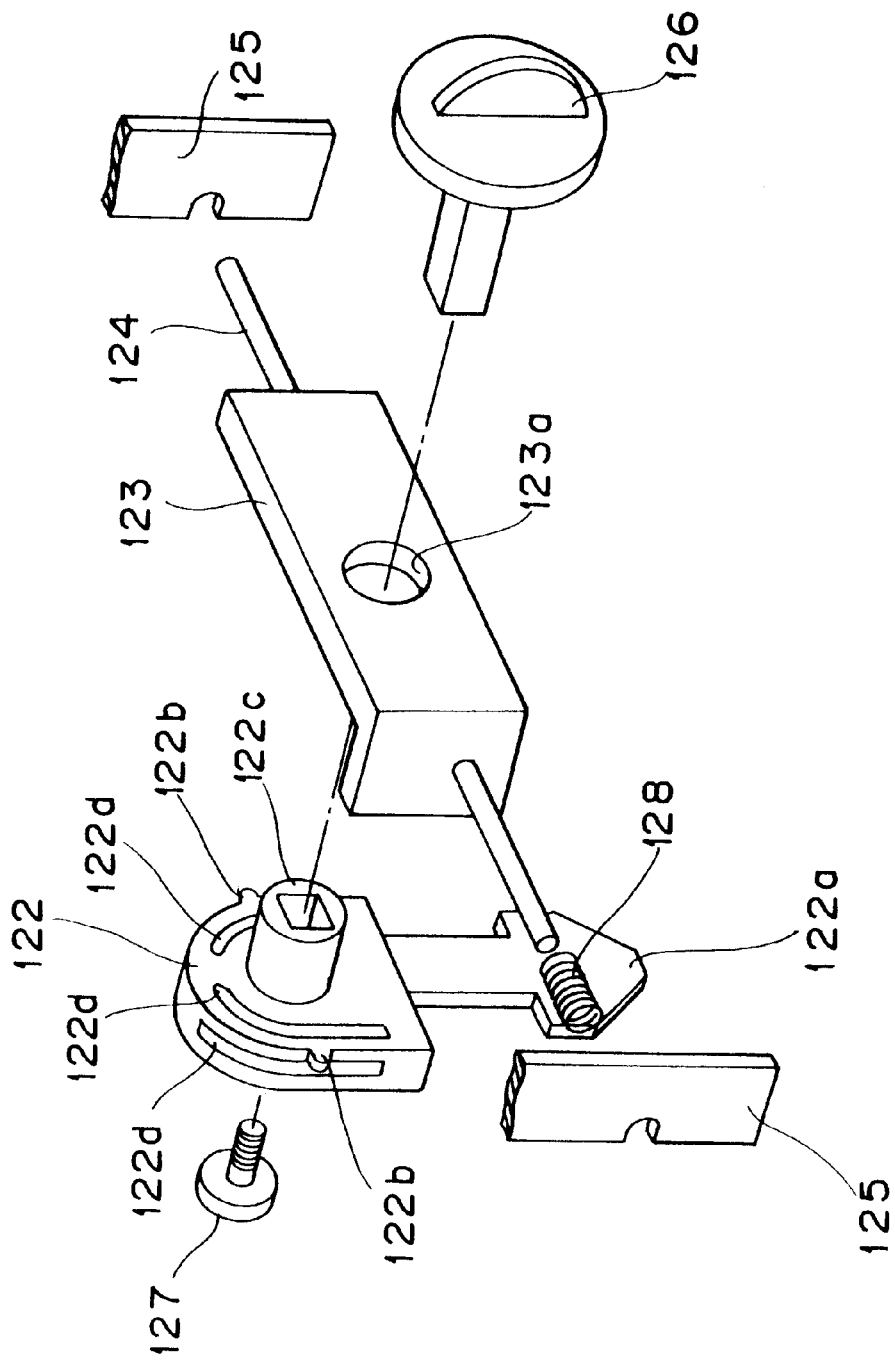
FIG. 9 is a fragmentary perspective view showing a principal portion of the second embodiment of the hook mechanism.

The present apparatus adopts such a second embodiment of the hook mechanism as shown in FIGS. 8A, 8B and 9 in order to keep the closed condition of the cover 113 with respect to the apparatus body 111 from the point of view of transportation and so forth.

Two holes 118 each in the form of an elongated through-hole of a substantially rectangular shape are formed in a housing 117 of the apparatus body 111 on the opposite sides of the keyboard unit 112. Meanwhile, two holes 120 each in the form of an elongated through-hole of a rectangular shape are formed in a housing 119 of the cover 113 on the opposite sides of the display unit 115 corresponding to the holes 118.

Two holes 121 each in the form of an elongated through-hole of a substantially rectangular shape are formed at positions on a face (rear face) 119b on the opposite side of a front face 119a of the housing 119 individually corresponding to the holes 118.

Reference numeral 122 denotes a hook member having a pawl 122a for releasably engaging with a corresponding one of the holes 118. Each of the hook members 122 has resilient portions each having a protrusion 122b and a post-like projection 122c having a rectangular hole therein.

Reference numeral 123 denotes a holder member (slider), and a shaft member 124 is integrally secured to the holder member 123. A pair of support members 125 are provided integrally in the proximity of positions of an inner face of the housing 119 corresponding to the holes 120 and 121.

Each of the support members 125 has a through-hole formed therein, and the shaft member 124 is inserted in the through-holes of the support members 125 to support the holder member 123 for sliding movement.

Each of the hook members 122 is mounted for pivotal motion on the corresponding holder member 123 by inserting, in a condition wherein the projection 122c of the hook member 122 is inserted in a through-hole 123a of the corresponding holder member 123, a knob member 126 from the outside into a through-hole formed in a side wall of the housing 119 and into the rectangular hole of the projection 122c of the hook member 122 and screwing a screw 127 into an end of the knob member 126 from the opposite side.

Reference numeral 128 denotes a coil spring for biasing the hook member 122 so that the pawl 122a may be engaged with the corresponding hole 118. Further, the holder member 123 has a recess 123b formed thereon with which a protrusion 122b of the hook member 122 can be engaged. A pair of slits 122d are formed in the hook member 122 so that the protrusions 122b may be supported resiliently.

When the information processing apparatus is not used, each of the knob members 126 is turned until the pawl 122a of the hook member 122 passes through the hole 120 and projects from the front face 119a (face adjacent the display unit 115), and then the cover 113 is closed around the first axis 114 such that the display unit 115 may oppose the keyboard unit 112. Consequently, the pawl 122a of the hook member 122 is engaged with the hole 118 by the biasing force of the coil spring 128 and the cover 113 is put into a condition wherein it is closed with respect to the apparatus body 111.

When it is intended to open the cover 113 around the first axis 114, the knob member 126 is slidably moved against the biasing force of the coil spring 128 to cancel the engagement of the pawl 122a of the hook member 122 with the hole 118.

When the information processing apparatus is used to perform an inputting operation using the stylus, the cover 113 is reversed around the second axis 116 from the open condition (condition of FIG. 7A), and the knob member 126 is turned until the pawl 122a of the hook member 122 passes through the hole 121 and projects to the rear face 119b side.

Then, if the cover 113 is closed around the first axis 114 such that the rear face 119b opposes the keyboard unit 112, then the pawl 122a of the hook member 122 is engaged with the hole 118 by the biasing force of the coil spring 128 so that the cover 113 is put into a closed condition with respect to the apparatus body 111 in the condition shown in FIG. 7B.

When it is intended to open the cover 113 around the first axis 114, the knob member 126 is slidably moved against the biasing force of the coil spring 128 to cancel the engagement of the pawl 122a of the hook member 122 with the hole 118.

The hook member 122 is resiliently engaged at one of the protrusions 122 thereof with the recess 123b of the holder member 123 in a condition wherein the pawl 122a projects from the hole 120 or the hole 121. Accordingly, positioning when the hook member 122 is pivoted is sure, and engagement of the pawl 122a with the hole 118 is performed with certainty.

According to the second embodiment, since it is constructed such that the single pawl 122a is selectively projected from the hole 120 or 121 by pivoting the hook member 122 by 180 degrees, the cover 113 can be locked to the apparatus body 111 not only in a condition wherein the display unit 115 opposes the apparatus body 111 but also in another condition wherein the display unit 115 is directed upwardly, and in any of the two conditions, the information inputting apparatus can be carried without any trouble.

Further, also in a condition wherein the display unit 115 is directed upwardly, the pawl 122a of the hook member 122 can be accommodated into the housing 119 by a turning operation of the hook member 122, and an obstacle to a manual operation caused by the pawl 122a of the hook member 122 when it is in a projecting condition is eliminated.

Figure 10A:
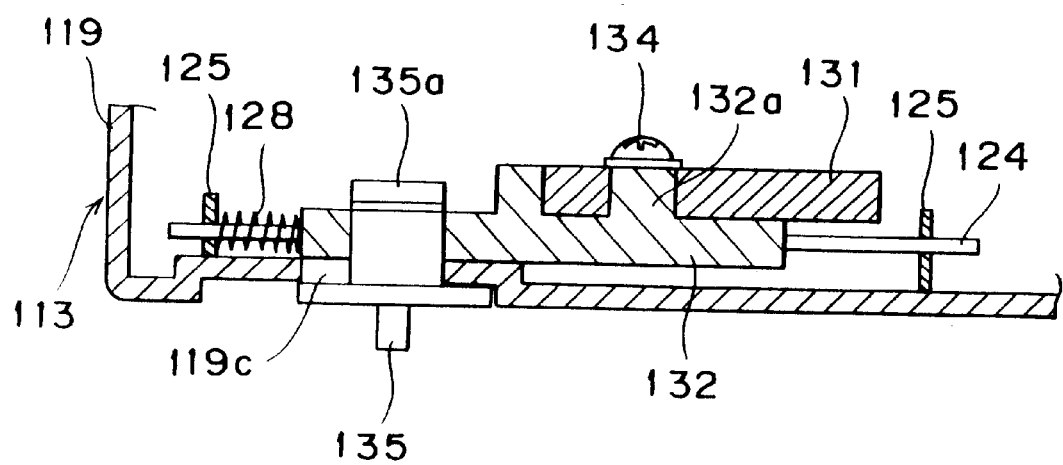
FIGS. 10A and 10B are sectional views showing a third embodiment of the hook mechanism which can be applied to the present invention.
Figure 10B:
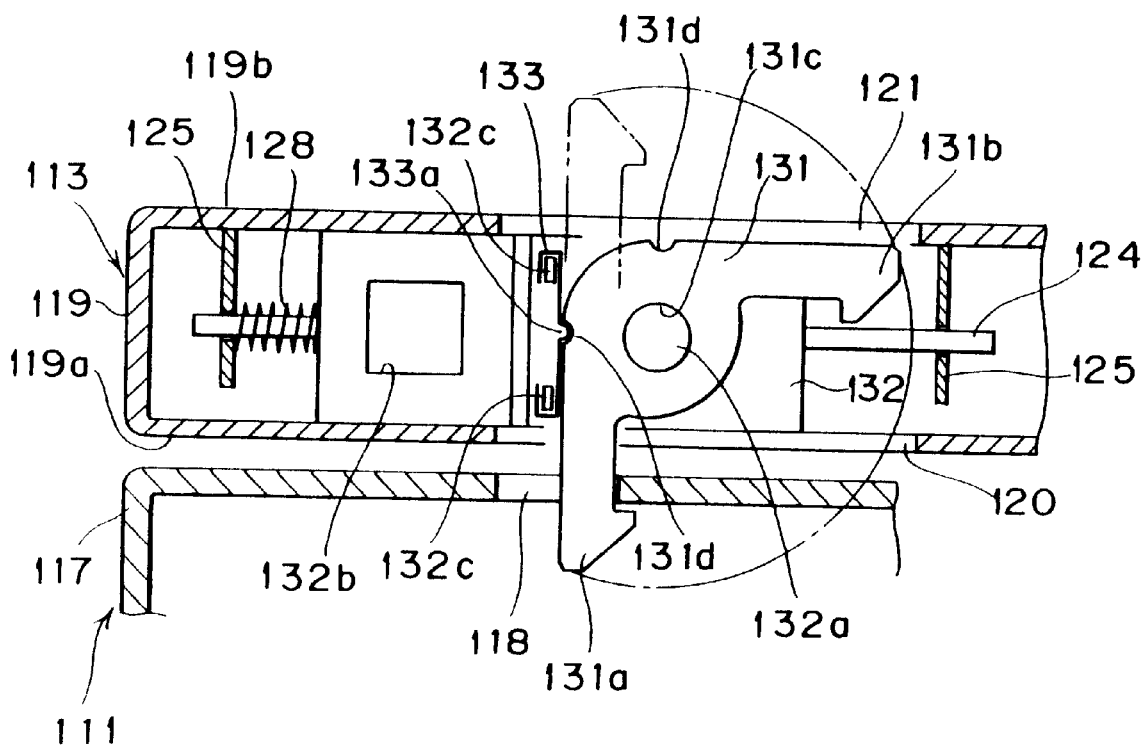

Referring now to FIGS. 10A and 10B as well as 11, there is shown a third embodiment of the hook mechanism.

Reference numeral 131 denotes a hook member having a pair of pawls 131a and 131b which releasably engage with a hole 118 of the housing 117. The pawls 131a and 131b are disposed substantially in a perpendicular relationship to each other. The hook member 131 has a through-hole 131c at a central portion thereof, and further has a pair of recesses 131d.

Reference numeral 132 denotes a holder member (slider), and the shaft member 124 is integrally secured to the holder member 132. The holder member 132 has a post-like projection 132a, a rectangular hole 132b, and a pair of spring mounting projections 132c. A spring 133 having a protrusion 133a is attached to the projections 132c.

The hook member 131 is supported for pivotal motion on the holder member 132 as a screw 134 is screwed in an end of the projection 132a in a condition wherein the projection 132a of the holder member 132 is inserted in the through-hole 131c.

Reference numeral 135 denotes a knob member, and the knob member 135 has a pair of engaging projections 135a. The engaging projections 135a are inserted from the outside in a through-hole 119c formed in a side wall of the housing 119 and further inserted in and engaged with the rectangular hole 132b of the holder member 132 to secure the knob member 135 to the holder member 132. Reference numeral 128 denotes a coil spring for biasing the hook member 131 so that the pawl 131a or 131b thereof may be engaged with the hole 118.

When the present information processing apparatus is not used, the hook member 131 is pivoted until the pawl 131a of the hook member 131 passes through the hole 120 and projects from the front face (face adjacent the display unit 115) 119a. Then, if the cover 113 is closed around the first axis 114 such that the display unit 115 may oppose the keyboard unit 112, then the pawl 131a of the hook member 131 is engaged with the hole 118 by the biasing force of the coil spring 128 and the cover 113 is put into a condition wherein it is closed with respect to the apparatus body 111.

When it is intended to open the cover 113 around the first axis 114, the knob member 135 is slidably moved against the biasing force of the coil spring 128 to cancel the engagement of the pawl 131a of the hook member 131 with the hole 118.

When the present information processing apparatus is used to perform an inputting operation using the stylus, the cover 113 is reversed around the second axis 116 from the open condition (condition of FIG. 7A) and the hook member 131 is pivoted until the other pawl 131b of the hook member 131 passed through the hole 121 and projects to the rear face 119b side.

Then, if the cover 113 is closed around the first axis 114 such that the rear face 119b thereof opposes the keyboard unit 112, then the pawl 131b of the hook member 131 is engaged with the hole 118 by the biasing force of the coil spring 128 and the cover 113 is put into a condition wherein it is closed with respect to the apparatus body 111 in the condition shown in FIG. 7B.

When it is intended to open the cover 113 around the first axis 114, the knob member 135 is slidably moved against the biasing force of the coil spring 128 to cancel the engagement of the pawl 131b of the hook member 131 with the hole 118.

Since the protrusion 133a of the spring 133 is resiliently engaged with one of the recesses 131d of the hook member 131 in a condition wherein the one pawl 131a projects from the hole 120 or the other pawl 131b projects from the hole 121, positioning of the hook member 131 when it is pivoted is sure, and engagement of the pawl 131a or 131b with the hole 118 is performed with certainty.

According to the third embodiment, since it is constructed such that the one hook member 131 is selectively projected from the hole 120 or the other pawl 131b is selectively projected from the hole 121 by pivoting the hook member 131 by approximately 90 degrees, the cover 113 can be locked to the apparatus body 111 not only in a condition wherein the display unit 115 opposes the apparatus body 111 but also in another condition wherein the display unit 115 is directed upwardly, and in any of the two conditions, the information processing apparatus can be carried without any trouble.

Further, also in a condition wherein the display unit 115 is directed upwardly, the pawl 131b of the hook member 131 can be accommodated into the housing 119 by a turning operation of the hook member 131, and also an obstacle to a manual operation caused by the pawl 131b of the hook member 131 when it is in a projecting condition is eliminated.

Figure 12A:
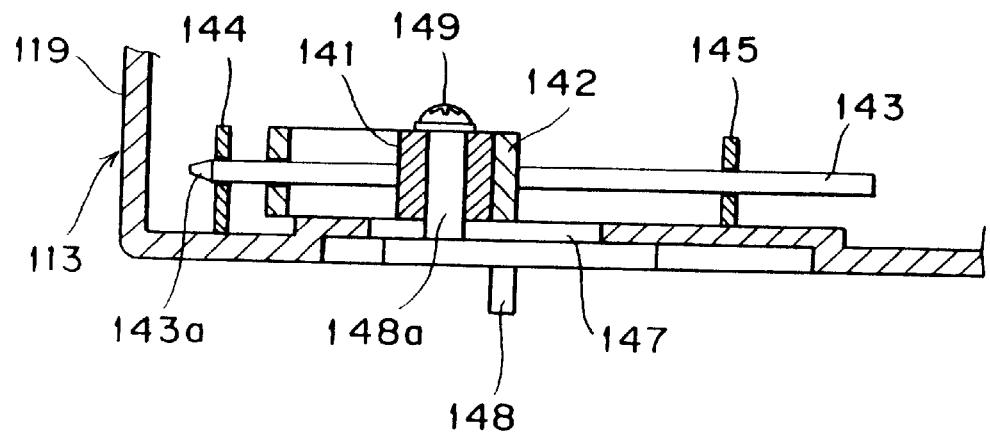
FIGS. 12A and 12B are sectional views showing a fourth embodiment of the hook mechanism which can be applied to the present invention.
Figure 12B:
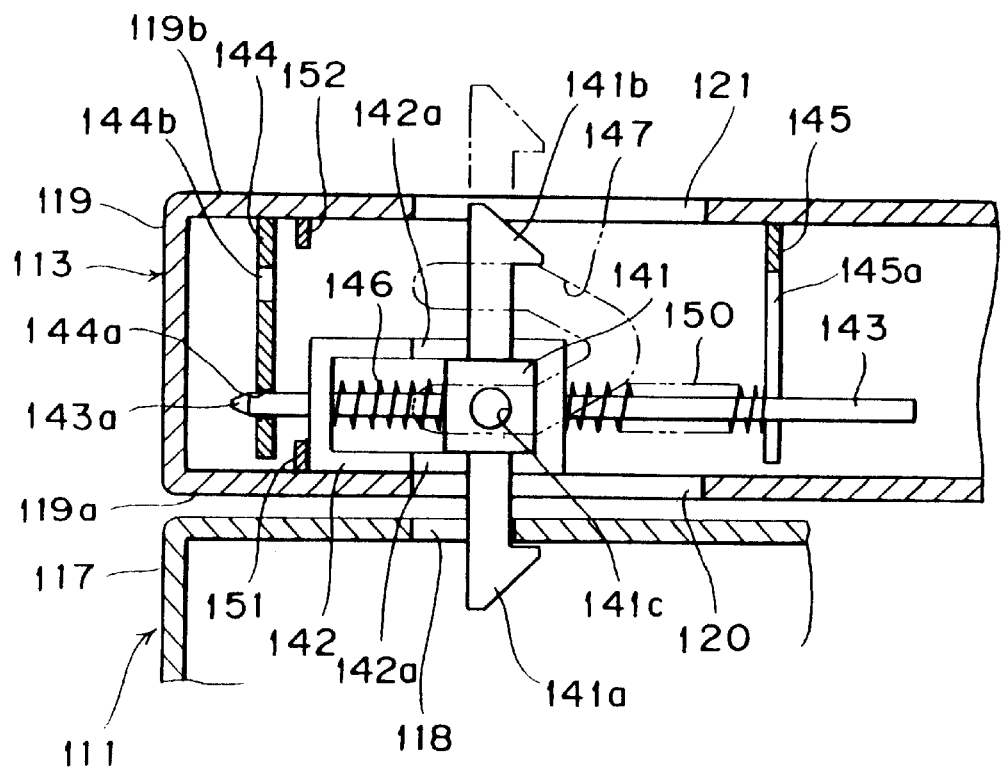

Referring now to FIGS. 12A and 12B as well as 13, there is shown a fourth embodiment of the hook mechanism.

Reference numeral 141 denotes a hook member having a pair of pawls 141a and 141b which releasably engage with the hole 118 of the housing 117. The pawls 141a and 141b are formed such that they extend substantially in the opposite directions to each other. The hook member 141 has a through round hole 141c at a central body portion thereof.

Reference numeral 142 denotes a holder member (slider), and the holder member 142 has a pair of rectangular frame members integrally secured thereto and has a pair of slits 142a formed at upper and lower portions thereof. A shaft member 143 is integrally secured to the holder member 142. An end portion 143a of the shaft member 143 has a tapering shape.

A pair of support members 144 and 145 are provided in the proximity of positions of an inner face of the housing 119 corresponding to the holes 120 and 121. A pair of through-holes 144a and 144b are formed at upper and lower portions of the support member 144, respectively, and a slit 145a is formed in the support member 145. The shaft member 143 is inserted in one of the through-holes 144a and 144b and the slit 145a to support the holder member 142 for sliding movement.

The hook member 141 is supported for sliding movement on the inner side of the holder member 142 as it is disposed such that a body portion of the hook member 141 is positioned on the inner side of the frame members of the holder member 142 and the pawls 141a and 141b extend through the slits 142a and project upwardly and downwardly, respectively. Reference numeral 146 denotes a coil spring, and the coil spring 146 biases the hook member 141 in a direction in which the pawl 141a or 141b is engaged with the hole 118 on the inner side of the holder member 142.

Figure 13:
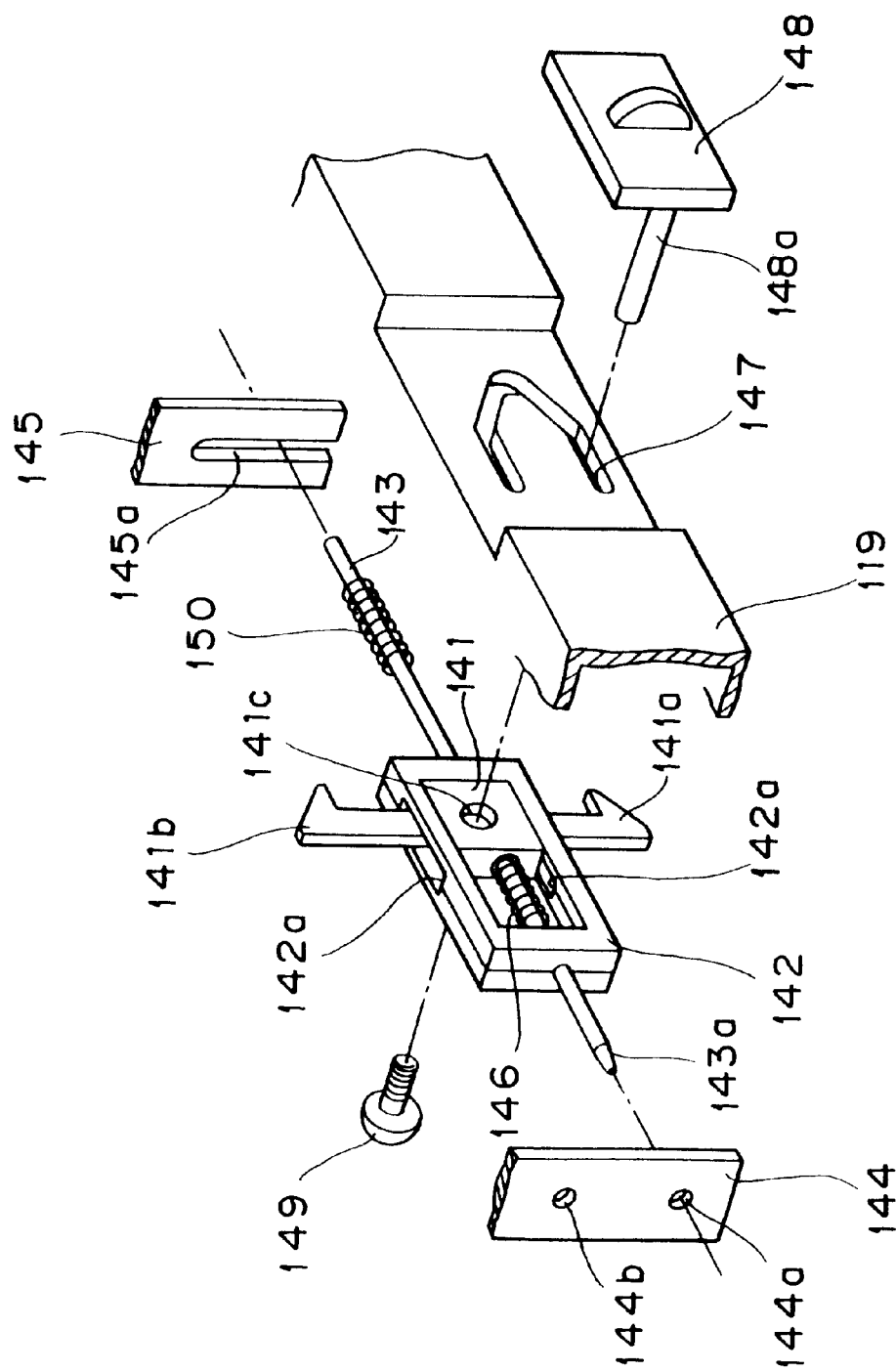
FIG. 13 is a fragmentary perspective view showing a principal portion of the fourth embodiment of the hook mechanism.

A guideway 147 of a substantially U- or V-shape laid down horizontally as seen in FIGS. 12B and 13 is formed in a side wall of the housing 119. Reference numeral 148 denotes a knob member, and the knob member 148 is mounted on the hook member 141 such that a post-like projection 148a thereof is inserted from the outer side in the guideway 147 and further in the round hole 141c of the body portion of the hook member 141 and a screw 149 is screwed in an end of the projection 148a of the knob member 148.

Reference numeral 150 denotes a coil spring for biasing the holder member 142 toward the support member 144. A pair of stopper members 151 and 152 for limiting the sliding movement of the holder member 142 are provided on the inner side of the housing 119.

When the information processing apparatus is not used, if the knob member 148 is moved toward the front face 119a (display unit 115) side along the guideway 147, then the end portion 143a of the shaft member 143 of the holder member 142 is inserted into the through-hole 144a of the support member 144 adjacent the front surface 119a by the biasing force of the coil spring 150 and the holder member 142 is contacted with the stopper member 151, and the one pawl 141a of the hook member 141 passes through the hole 120 and comes to a condition wherein it projects from the front surface 119a.

If, in this condition, the cover 113 is closed around the first axis 114 so that the display unit 115 opposes the keyboard unit 112, then the one pawl 141a of the hook member 141 is engaged with the hole 118 by the biasing force of the coil spring 146 and the cover 113 is put into a condition wherein it is closed with respect to the apparatus body 111.

When it is intended to open the cover 113 around the first axis 114, the knob member 148 is slidably moved against the biasing force of the coil spring 146 to slidably move the hook member 141 in the holder member 142 to cancel the engagement of the pawl 141a of the hook member 141 with the hole 118.

When the present information processing apparatus is used to perform an inputting operation using the stylus, the cover 113 is reversed around the second axis 116 from the open condition (condition of FIG. 7A) and the knob member 148 is moved toward the rear face 119b side along the guideway 147. Consequently, the end portion 143a of the shaft member 143 of the holder member 142 is inserted into the hole 144b of the support member 144 adjacent the rear face 119b by the biasing force of the coil spring 150 and the holder member 142 is contacted with the stopper member 152, and the pawl 141b of the hook member 141 passes through the hole 121 and is projected from the rear face 191b.

Then, if the cover 113 is closed around the first axis 114 so that the rear face 119b may oppose the keyboard unit 112, then the pawl 141b of the hook member 141 is engaged with the hole 118 by the biasing force of the coil spring 146, and the cover 113 is put into a condition wherein it is closed with respect to the apparatus body 111 in the condition shown in FIG. 7B.

When it is intended to open the cover 113 around the first axis 114, the knob member 148 is slidably moved against the biasing force of the coil spring 146 to slidably move the hook member 141 in the holder member 142 to cancel the engagement of the pawl 141b of the hook member 141 with the hole 118.

According to the fourth embodiment, since it is constructed such that the length of each of the pawls 141a and 141b of the hook member 141 is set suitably so that the pawl 141a of the hook member 141 is selectively projected from the hole 120 or the pawl 141b of the hook member 141 is selectively projected from the hole 121, the cover 113 can be locked to the apparatus body 111 not only in a condition wherein the display unit 115 opposes the apparatus body 111 but also in another condition wherein the display unit 115 is directed upwardly, and in any of the two conditions, the information processing apparatus can be carried without any trouble.

Further, since the hook member 141 can be slidably moved not only in the longitudinal direction of the holes 120 and 121 but also in a direction perpendicular to the holes 120 and 121, also in a condition wherein the display unit 115 is directed upwardly, the pawl 141b of the hook member 141 can be accommodated into the housing 119 and also an obstacle to a manual operation caused by the pawl 141b of the hook member 141 when it is in a projecting condition is eliminated.

Figure 14A:
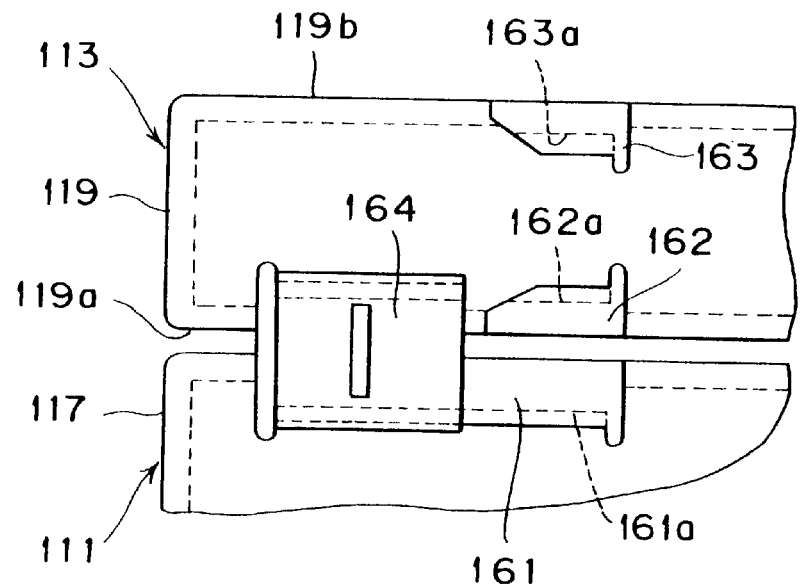
FIGS. 14A and 14B are a side elevational view and a sectional view, respectively, showing a principal portion of a further embodiment of the information processing apparatus according to the present invention.
Figure 14B:
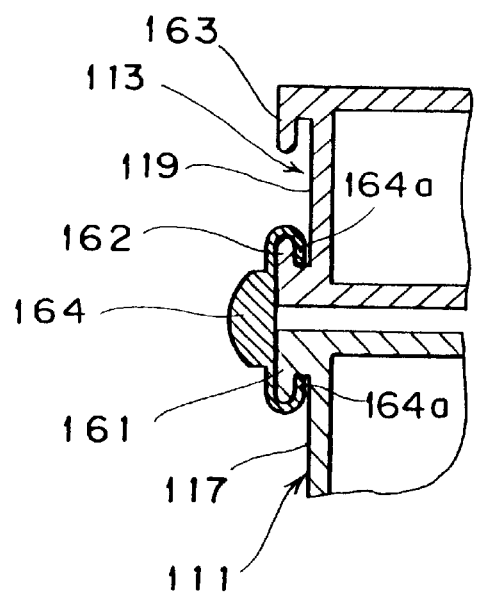
Figure 15:
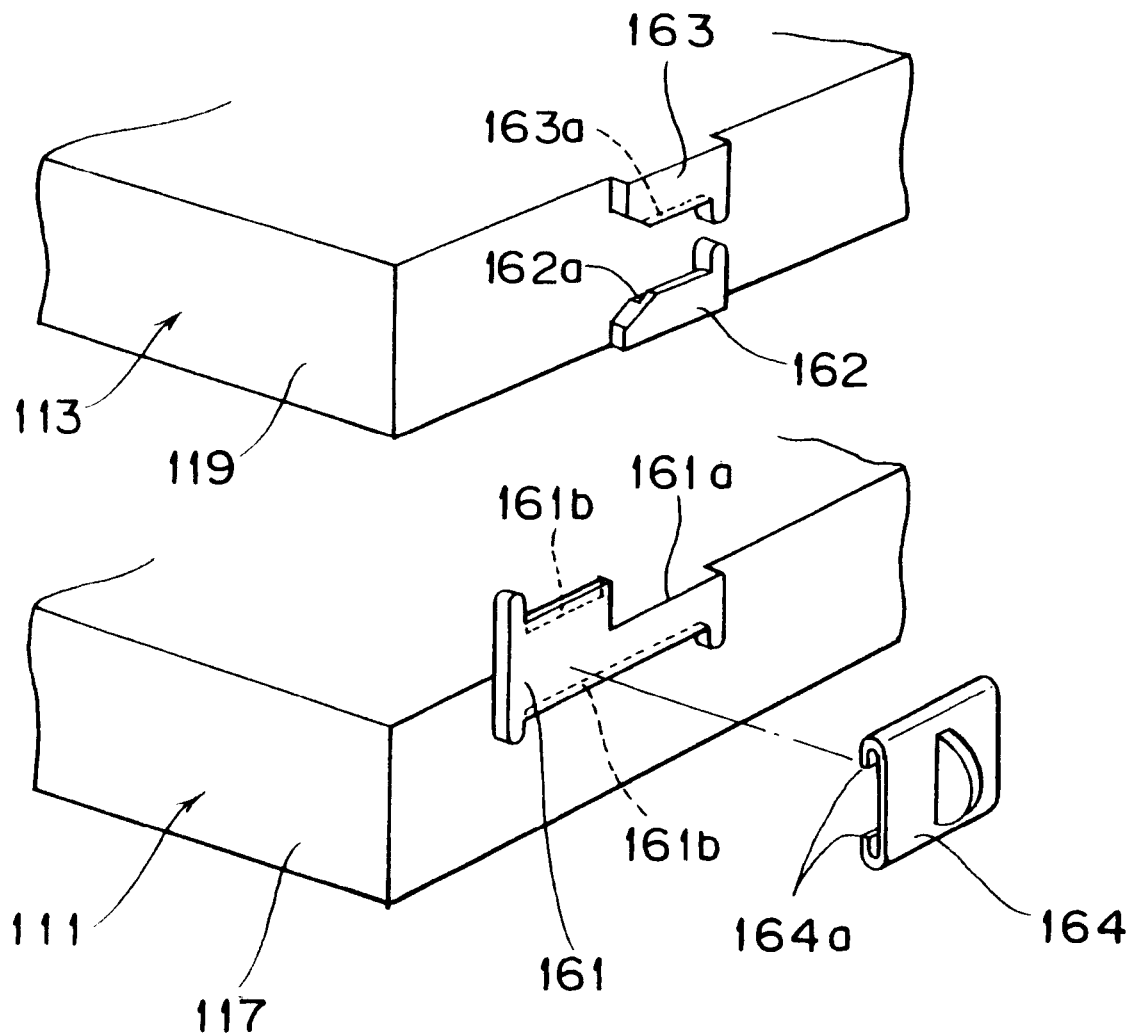
FIG. 15 is a fragmentary perspective view of the principal portion shown in FIGS. 14A and 14B.

Referring now to FIGS. 14A and 14B as well as 15, there is shown a further embodiment of the information processing apparatus according to the present invention. Here, in order to attain at least one of the objects of the present invention without using a hook mechanism, the apparatus shown in FIGS. 7A and 7B is improved.

A first guide member 161 in the form of a thin plate having a convex shape is securely mounted or integrally formed on each of the opposite side faces of the apparatus body 111. The first guide member 161 has a recessed portion 161a and has two recessed grooves 161b formed at upper and lower portions thereof.

A second guide member 162 in the form of a thin plate having a convex shape is securely mounted or integrally formed at a portion of each of the opposite side portions of the cover 113 corresponding to the recessed portions 161a on the face (front surface) 119a side on which the display unit 115 is provided. The second guide member 162 has a recessed groove 162a.

A third guide member 163 in the form of a thin plate having a convex shape and formed symmetrically to the second guide member 162 is securely mounted or integrally formed at a portion of each of the opposite sides of the cover 113 corresponding to the recessed portion 161a on the rear face 119b (rear surface) side opposite to the face on which the display unit 115 is provided. The third guide member 163 has a recessed groove 163a.

Reference numeral 164 denotes a slider member, and upper and lower edge portions 164a of the slider member 164 are curved or bent so as to each have a generally U-shape. The slider member 164 is fitted for sliding movement on the first guide member 161 such that the edge portions 164a are received in the recessed grooves 161b of the first guide member 161 in such a manner as to hold the first guide member 161 therebetween.

When the information processing apparatus is not used, if the cover 113 is closed around the first axis 114 such that the display unit 115 opposes the keyboard unit 112 in a condition wherein the slider member 164 is positioned remotely from the recessed portion 161a of the first guide member 161, then the second guide member 162 is positioned in the recessed portion 161a of the first guide member 161. If, in this condition, the slider member 164 is slidably moved toward the recessed portion 161a, then the first guide member 161 and the second guide member 162 are held in-between by the slider member 164 and the condition wherein the cover 113 is closed with respect to the apparatus body 111 is kept.

When it is intended to open the cover 113 around the first axis 114, the slider member 164 is slidably moved reversely to allow the locked condition to be cancelled.

When the information processing apparatus is used to perform an inputting operation using the stylus, the cover 113 is reversed around the second axis 116 from the open condition (condition of FIG. 7A) and the cover 113 is closed around the first axis 114 so that the rear face 119b may oppose the keyboard unit 112. Consequently, the third guide member 163 is put into a condition wherein it is positioned in the recessed portion 161a of the first guide member 161. If, in this condition, the slider member 164 is slidably moved toward the recessed portion 161a side, then the first guide member 161 and the third guide member 163 are held in-between by the slider member 164 and the condition wherein the cover 113 is closed with respect to the apparatus body 111 is kept.

When it is intended to open the cover 113 around the first axis 114, the slider member 164 is slidably moved reversely to allow the locked condition to be cancelled.

According to the present embodiment, since it is constructed such that the first guide member 161 and the second guide member 162 or the first guide member 161 and the third guide member 163 are held in-between by the slider member 164 to establish a locked condition, the cover 113 can be locked to the apparatus body 111 not only in a condition wherein the display unit 115 opposes the apparatus body 111 but also another condition wherein the display unit 115 is directed upwardly, and in any of the two conditions, the apparatus can be carried without any trouble.

In this manner, while, in the embodiments of FIGS. 7A to 15, the present invention is applied to an information processing apparatus of a type different from that of the embodiment of FIGS. 1 to 6 in this manner, the embodiments of FIGS. 7A to 15 may be suitably modified and applied to the embodiment of FIGS. 1 to 6. Since such modification could be made readily by those skilled in the art, detailed description of the same is omitted herein. Further, the hook mechanism 20 shown in FIGS. 5A and 5B can be suitably modified and applied to the embodiment of FIGS. 7A and 7B.

As described above, according to the present invention, an effect that an information processing apparatus of a simple construction having two members by which two different closed conditions can be kept can be provided is achieved. Further, according to the present invention, also another effect that a hook mechanism which can be applied to such an apparatus as just described can be provided is achieved. Since the effects by the particular embodiments of the present invention are such as described above, description of them is omitted here.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An information processing apparatus, comprising:
a first member having a first face and a second face;
a second member; and
a connection unit having two axes for pivotally connecting said first and second members each other such that said first and second members are displaceable relative to each other in a range of 360° between a first condition wherein said first face of said first member opposes said second member and a second condition wherein said second face of said first member opposes said second member,
said first member having a hook member provided thereon such that said hook member can be selectively projected from one of said first and second faces,
said second member having a hole for being engaged by said hook member.

2. An information processing apparatus according to claim 1, wherein:
said second member has a third face and a fourth face;
said hole is provided in each of said third and fourth faces; and
said two axes extending parallel to each other included in said connection unit individually support said first member for pivotal motion,
wherein said hook member is engaged with said hole of said third face with said first face and said third face opposed to each other in the first condition, and said hook member is engaged with said hole of said fourth face with said second face and said fourth face opposed to each other in the second condition.

3. An information processing apparatus according to claim 1, wherein:
said second member has a third face and a fourth face;
said hole is provided in said third face; and
said two axes extending perpendicularly to each other included in said connection unit individually support said first member for pivotal motion,
wherein said hook member is engaged with said hole with said first face and said third face opposed to each other in the first condition, and said hook member is engaged with said hole with said second face and said third face opposed to each other in the second condition.

4. An information processing apparatus according to claim 2, wherein:
said first member has a display unit on said first face thereof; and
said second member has a keyboard unit on said third face thereof; and
wherein, said display unit and said keyboard unit are confined between said first and second members in the first condition, and said display unit and said keyboard unit are directed outwardly of said information processing apparatus in the second condition.

5. An information processing apparatus according to claim 4, wherein:
said first member has a display unit on said first face thereof; and
said second member has a keyboard unit on said third face thereof;
wherein, said display unit and said keyboard unit are confined between said first and second members in the first condition, and said display unit is directed outwardly of said information processing apparatus in the second condition.

6. An information processing apparatus, comprising:
a first member having a first face and a second face;
a second member; and
a connection unit for connecting said first and second members to each other such that said first and second members are displaceable relative to each other between a first condition wherein said first face of said first member opposes said second member and a second condition wherein said second face of said first member opposes said second member,
said first member having a hook member provided thereon such that said hook member can be selectively projected from one of said first and second faces;
said second member having a hole for being engaged by said hook member, wherein:

said first member further has a slider mounted for sliding movement therein;

said hook member is mounted for pivotal motion within a range of approximately 90 degrees with respect to said slider; and said hook member has a first pawl and a second pawl disposed substantially perpendicularly to each other, wherein said first pawl can be engaged with said hole while said second pawl can be positioned in said first member in the first condition, and said second pawl can be engaged with said hole while said first pawl can be positioned in said first member in the second condition.

7. An information processing apparatus according to claim 6, wherein said first member further has a spring for biasing said hook member in its pivoting direction.

8. An information processing apparatus, comprising:

a first member having a first face and a second face a second member; and a connection unit for connecting said first and second members to each other such that said first and second members are displaceable relative to each other between a first condition wherein said first face of said first member opposes said second member and a second condition wherein said second face of said first member opposes said second member;

said first member having a hook member provided thereon such that said hook member can be selectively projected from one of said first and second faces;

said second member having a hole for being engaged by said hook member, wherein:

said first member further has a slider mounted for sliding movement therein, said hook member is mounted for pivotal motion within a range of approximately 180 degrees with respect to said slider, and said hook member has a single pawl.

9. An information processing apparatus, comprising:

a first member having a first face and a second face;

a second member; and a connection unit for connecting said first and second members to each other such that said first and second members are displaceable relative to each other between a first condition wherein said first face of said first member opposes said second member and a second condition wherein said second face of said first member opposes said second member, said first member having a hook member provided thereon such that said hook member can be selectively projected from one of said first and second faces, said second member having a hole for being engaged by said hook member, wherein:

said hook member has first and second pawls extending substantially in the opposite direction to each other, each of said first and second pawls has a length set such that, when said first pawl projects from said first face, said second pawl is positioned in said first member, but when said second pawl projects from said second face, said first pawl is positioned in said first member, and said first member further has means for supporting said hook member for sliding movement in each of a condition wherein said first pawl projects from said first face and another condition wherein said second pawl projects from said second face.

10. A hook mechanism, comprising:

a housing having a first face and a second face;

a slider mounted for sliding movement in said housing;

a hook member mounted for pivotal motion within a range of approximately 90 degrees with respect to said slider; and a spring for biasing said hook member in its pivoting direction;

said hook member having a first pawl and a second pawl disposed substantially perpendicularly to each other;

said first pawl being positioned in said housing when said second pawl projects from said second face whereas, when said first pawl projects from said first face, said second pawl is positioned in said housing.

11. An information processing apparatus, comprising:

a first member having a first face and a second face;

a second member;

a connection unit for connecting said first and second members to each other such that said first and second members are displaceable relative to each other between a first condition wherein said first face of said first member opposes said second member and a second condition wherein said second face of said first member opposes said second member; and a slider mounted for sliding movement between a position in which said slider holds said first and second members in-between and another position in which said slider does not hold said first and second members in-between in each of the first and second conditions.

12. An apparatus comprising:

a first member having a first face and a second face;

a second member;

a connecting portion connecting said first and second members to each other such that said first and second members are displaceable relative to each other between a first condition wherein said first face opposes said second member and a second condition wherein said second face opposes said second member;

a first engaging portion provided on said first member; and a second engaging portion provided on said second member, wherein said first engaging portion is displaceable between a position where said first engaging portion can be engaged with said second engaging portion on a side of said first face and a position where said first engaging portion can be engaged with said second engaging portion on a side of said second face.

13. An apparatus according to claim 12, wherein said connecting portion has an axis extending perpendicularly to said second member for rotatively supporting said first member.

14. An apparatus according to claim 12, wherein:

said connecting portion has two axes extending perpendicularly to each other;

said two axes position said first member such that said first face opposes said second member in said first condition; and said two axes position said first member such that said second face opposes said second member in said second condition.

15. An apparatus according to claim 12, wherein:

said first engaging portion is engaged with said second engaging portion through said first face in said first condition; and said first engaging portion is engaged with said second engaging portion through said second face in said second condition.

16. An apparatus according to claim 12, wherein said first engaging portion comprises a hook member which can be selectively projected from one of said first and second faces.

17. An apparatus according to claim 12, wherein said connecting portion connects said first and second members to each other such that said first member is supported for pivotal motion subsequently within a range of 360 degrees with respect to said second member.

18. An apparatus according to claim 12, wherein said connecting portion has two axes each rotatively supporting said first and second members.

19. An apparatus according to claim 12, wherein:

said first engaging portion has a first engaging member and a second engaging member; and said first engaging portion is displaceable between a third condition where said first engaging member is positioned on a side of said first face and a fourth condition where said second engaging member is positioned on a side of said second face.

20. An apparatus according to claim 12, wherein:

said first engaging portion has an engaging member; and said first engaging portion is displaceable between a third condition where said engaging member is positioned on said first face and a fourth condition where said engaging member is positioned on said second surface.

21. An apparatus according to claim 12, wherein:

said first engaging portion has a first engaging member and a second engaging member extending substantially in the opposite directions to each other;

said first engaging portion is provided on said first member so as to be displaceable toward said first and second faces; and said first engaging portion is displaceable between a third condition wherein said first engaging member is positioned on a side of said first face when said first engaging portion moves toward said first face and a fourth condition wherein said second engaging member is positioned on a side of said second face when said first engaging portion moves toward said second face.

22. An apparatus according to claim 12, further comprising a display device provided on said first face of said first member.

23. An apparatus according to claim 12, further comprising an input device provided on said second member.

24. An apparatus according to claim 12, further comprising a touch input device provided on said first face of said first member.

25. An apparatus according to claim 16, wherein said second engaging portion is a hole portion with which said hook member is engaged.

26. An apparatus according to claim 19, further comprising a biasing portion biasing said first engaging portion toward said third condition.

27. An apparatus according to claim 19, wherein:

said first and second engaging members are provided so as to be substantially perpendicular to each other; and said first engaging portion can be rotative substantially within a range of 90 degrees.

28. An apparatus according to claim 19, wherein:

said first member has a slider slidably provided therein;

said first and second engaging members are provided so as to be substantially perpendicular to each other; and said first engaging portion is provided on said slider so as to be rotatable substantially within a range of 90 degrees.

29. An apparatus according to claim 20, wherein said engaging member is provided on said first engaging portion so as to be rotatable within a range of 180 degrees.

30. An apparatus according to claim 20, wherein said first member has a slider therein;

said first engaging portion is provided on said slider; and said engaging member is provided so as to be rotatable within a range of 180 degrees.

31. An apparatus according to claim 27 or 28, further comprising a biasing member biasing said first engaging portion in its rotational direction.

32. An apparatus according to claim 27 or 29, further comprising a biasing portion biasing said first engaging portion toward said third condition.

33. An apparatus according to claim 21, wherein said first member has a slider, and said first engaging portion is provided on said slider.

34. An apparatus according to claim 19 or 21, wherein said first engaging portion comprises a hook member, and said first engaging member and said second engaging member are a first pawl portion and a second pawl portion, respectively.

35. An apparatus comprising:

a first member having a first face and a second face;

a second member having a third face and a fourth face;

a connecting portion connecting said first and second members to each other such that said first and second members are displaceable relative to each other between a first condition wherein said first face opposes said third face and a second condition wherein said second face opposes said fourth face;

a first engaging portion provided on said first member; and a second engaging portion provided on said second member;

wherein, said first engaging portion is displaceable between a position where said first engaging portion can be engaged with said second engaging portion on a side of said first face and a position where said first engaging portion can be engaged with said second engaging portion on a side of said second face.

36. An apparatus according to claim 35, wherein:

said first engaging portion is engaged with said second engaging portion through said first face in said first condition; and said first engaging portion is engaged with said second engaging portion through said second face in said second condition.

37. An apparatus according to claim 35, wherein said first engaging portion comprises a hook member which can be selectively projected from one of said first and second faces.

38. An apparatus according to claim 35, wherein said connecting portion connects said first and second members to each other such that said first member is supported for pivotal motion substantially within a range of 360 degrees with respect to said second member.

39. An apparatus according to claim 35, wherein said connecting portion has two axes each rotatively supporting said first and second members.

40. An apparatus according to claim 35, wherein:

said first engaging portion has a first engaging member and a second engaging member; and said first engaging portion is displaceable between a third condition where said first engaging member is positioned on a side of said first face and a fourth condition where said second engaging member is positioned on a side of said second face.

41. An apparatus according to claim 35, wherein:

said first engaging portion has an engaging member; and said first engaging portion is displaceable between a third condition where said engaging member is positioned on said first face and a fourth condition where said engaging member is positioned on said second surface.

42. An apparatus according to claim 35, wherein:

said first engaging portion has a first engaging member and a second engaging member extending substantially in the opposite directions to each other;

said first engaging portion is provided on said first member so as to be displaceable toward said first and second faces; and said first engaging portion is displaceable between a third condition wherein said first engaging member is positioned on a side of said first face when said first engaging portion moves toward said first face and a fourth condition wherein said second engaging member is positioned on a side of said second face when said first engaging portion moves toward said second face.

43. An apparatus according to claim 35, further comprising a display device provided on said first face of said first member.

44. An apparatus according to claim 35, further comprising an input device provided on said third face of said second member.

45. An apparatus according to claim 35, further comprising a touch input device provided on said first face of said first member.

46. An apparatus according to claim 37, wherein said second engaging portion is a hole portion with which said hook member is engaged.

47. An apparatus according to claim 40, further comprising a biasing portion biasing said first engaging portion toward said third condition.

48. An apparatus according to claim 40, wherein:

said first and second engaging members are provided so as to be substantially perpendicular to each other; and said first engaging portion can be rotative substantially within a range of 90 degrees.

49. An apparatus according to claim 40, wherein:

said first member has a slider slidably provided therein;

said first and second engaging members are provided so as to be substantially perpendicular to each other; and said first engaging portion is provided on said slider so as to be rotatable substantially within a range of 90 degrees.

50. An apparatus according to claim 43 or 49, further comprising a biasing member biasing said first engaging portion in its rotational direction.

51. An apparatus according to claim 43 or 49, further comprising a biasing portion biasing said first engaging portion toward said third condition.

52. An apparatus according to claim 41, wherein said engaging member is provided on said first engaging portion so as to be rotatable within a range of 180 degrees.

53. An apparatus according to claim 41, wherein said first member has a slider therein;

said first engaging portion is provided on said slider; and said engaging member is provided so as to be rotatable within a range of 180 degrees.

54. An apparatus according to claim 42, wherein said first member has a slider, and said first engaging portion is provided on said slider.

55. An apparatus according to claim 40 or 42, wherein said first engaging portion comprises a hook member, and said first engaging member and said second engaging member are a first pawl portion and a second pawl portion, respectively.

56. An engaging mechanism comprising:

a housing having a first face and a second face;

an engaging portion provided for pivotable motion within a range of approximately 90 degrees within respect to said housing; and a biasing portion biasing said engaging portion in its pivoting direction; wherein:

said engaging portion has a first engaging member and a second engaging member disposed substantially perpendicularly to each other; and said first engaging member is positioned in said housing when said second engaging member is positioned on a side of said second face, and said second engaging member is positioned in said housing when said first engaging member is positioned on a side of said first face.

57. An engaging mechanism comprising:

a housing having a first face and a second face;

an engaging portion provided on said first member, for operating in a direction selected from a direction toward said first face and a direction toward said second face, said engaging portion having a first engaging member operating on a side of said first face and a second engaging member operating on a side of said second face; and a biasing portion biasing said engaging portion such that said first engaging member operates on the side of said first face.

\* \* \* \* \*